(12) United States Patent
Talpes et al.

(10) Patent No.: US 12,216,610 B2
(45) Date of Patent: *Feb. 4, 2025

(54) COMPUTATIONAL ARRAY MICROPROCESSOR SYSTEM USING NON-CONSECUTIVE DATA FORMATTING

(71) Applicant: Tesla, Inc., Austin, TX (US)

(72) Inventors: Emil Talpes, Austin, TX (US); William McGee, Austin, TX (US); Peter Joseph Bannon, Austin, TX (US)

(73) Assignee: Tesla, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,944

(22) Filed: Jun. 15, 2023

(65) Prior Publication Data

US 2023/0409519 A1    Dec. 21, 2023

Related U.S. Application Data

(63) Continuation of application No. 17/451,984, filed on Oct. 22, 2021, now Pat. No. 11,681,649, which is a
(Continued)

(51) Int. Cl.
*G06F 15/80* (2006.01)
*G06N 3/045* (2023.01)
(Continued)

(52) U.S. Cl.
CPC ......... *G06F 15/8023* (2013.01); *G06N 3/045* (2023.01); *G06N 3/048* (2023.01);
(Continued)

(58) Field of Classification Search
CPC .................................................. G06F 15/8023
See application file for complete search history.

(56) References Cited

U.S. PATENT DOCUMENTS 5,014,235 A    5/1991    Morton
5,239,636 A    8/1993    Fischer
(Continued)

FOREIGN PATENT DOCUMENTS

AU    2019261735 A1    6/2020
AU    2019201716 A1    10/2020
(Continued)

OTHER PUBLICATIONS

Genusov, Oct. 28, 1990, A new type of highly parallel 32-bit floating-point DSP vector signal processor, Modern Radar, 5:106-111.
(Continued)

*Primary Examiner* — Courtney P Spann
(74) *Attorney, Agent, or Firm* — Knobbe, Martens, Olson & Bear, LLP

(57) ABSTRACT

A microprocessor system comprises a computational array and a hardware data formatter. The computational array includes a plurality of computation units that each operates on a corresponding value addressed from memory. The values operated by the computation units are synchronously provided together to the computational array as a group of values to be processed in parallel. The hardware data formatter is configured to gather the group of values, wherein the group of values includes a first subset of values located consecutively in memory and a second subset of values located consecutively in memory. The first subset of values is not required to be located consecutively in the memory from the second subset of values.

20 Claims, 8 Drawing Sheets

Related U.S. Application Data continuation of application No. 15/920,173, filed on Mar. 13, 2018, now Pat. No. 11,157,441, which is a continuation-in-part of application No. 15/710,433, filed on Sep. 20, 2017, now Pat. No. 10,671,349.

(60) Provisional application No. 62/628,212, filed on Feb. 8, 2018, provisional application No. 62/625,251, filed on Feb. 1, 2018, provisional application No. 62/536,399, filed on Jul. 24, 2017.

(51) Int. Cl.
- G06N 3/048 (2023.01)
- G06N 3/063 (2023.01)
- G06N 3/08 (2023.01)

(52) U.S. Cl.
CPC ............... G06N 3/063 (2013.01); G06N 3/08 (2013.01); *G06F 2207/4824* (2013.01)

(56) References Cited

U.S. PATENT DOCUMENTS

| | | |
|---|---|---|
| 5,267,185 A | 11/1993 | Akabane |
| 5,311,459 A | 5/1994 | D'Luna et al. |
| 5,333,296 A | 7/1994 | Bouchard |
| 5,471,627 A | 11/1995 | Means et al. |
| 5,519,864 A | 5/1996 | Martell |
| 5,600,843 A | 2/1997 | Kato et al. |
| 5,717,947 A | 2/1998 | Gallup et al. |
| 5,742,782 A | 4/1998 | Ito |
| 5,850,530 A | 12/1998 | Chen |
| 5,887,183 A | 3/1999 | Agarwal et al. |
| 5,909,572 A | 6/1999 | Thayer et al. |
| 6,122,722 A | 9/2000 | Slavenburg |
| 6,195,674 B1 | 2/2001 | Elbourne |
| 6,289,138 B1 | 9/2001 | Yip et al. |
| 6,425,090 B1 | 7/2002 | Arimilli et al. |
| 6,446,190 B1 | 9/2002 | Barry |
| 6,847,365 B1 | 1/2005 | Miller et al. |
| 6,882,755 B2 | 5/2005 | Silverstein et al. |
| 7,209,031 B2 | 4/2007 | Nakai et al. |
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,912,476 B2 | 12/2014 | Fogg et al. |
| 8,913,830 B2 | 12/2014 | Sun et al. |
| 8,924,455 B1 | 12/2014 | Barman et al. |
| 8,928,753 B2 | 1/2015 | Han et al. |
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | McCarthy |
| 9,697,463 B2 | 7/2017 | Ross |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,074,051 B2 | 9/2018 | Thorson |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B2 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,417,560 B2 | 9/2019 | Henry et al. |
| 10,423,934 B1 | 9/2019 | Zanghi et al. |
| 10,436,615 B2 | 10/2019 | Agarwal et al. |
| 10,438,115 B2 | 10/2019 | Henry et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,478 B2 | 11/2019 | Shalev |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhai et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |

(56) References Cited

U.S. PATENT DOCUMENTS

| | | |
|---|---|---|
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,349 B2 | 6/2020 | Bannon et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,914 B2 | 8/2020 | Xiao et al. |
| 10,747,844 B2 | 8/2020 | Bannon et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B2 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,942,737 B2 | 3/2021 | Ivanov |
| 10,943,101 B2 | 3/2021 | Agarwal et al. |
| 10,943,132 B2 | 3/2021 | Wang et al. |
| 10,943,355 B2 | 3/2021 | Fagg et al. |
| 11,157,287 B2 | 10/2021 | Talpes |
| 11,157,441 B2 | 10/2021 | Talpes |
| 11,210,584 B2 | 12/2021 | Brand |
| 11,403,069 B2 | 8/2022 | Bannon et al. |
| 11,409,692 B2 | 8/2022 | Das Sarma et al. |
| 11,561,791 B2 | 1/2023 | Das Sarma |
| 11,681,649 B2 | 6/2023 | Talpes |
| 11,698,773 B2 | 7/2023 | Bannon |
| 11,893,393 B2 | 2/2024 | Taples et al. |
| 2002/0169942 A1 | 11/2002 | Sugimoto |
| 2003/0035481 A1 | 2/2003 | Hahm |
| 2004/0091135 A1 | 5/2004 | Bourg et al. |
| 2004/0148321 A1 | 7/2004 | Guevorkian et al. |
| 2005/0125369 A1 | 6/2005 | Buck et al. |

(56) References Cited

U.S. PATENT DOCUMENTS

| | | |
|---|---|---|
| 2005/0125477 A1 | 6/2005 | Genov et al. |
| 2005/0162445 A1 | 7/2005 | Sheasby et al. |
| 2005/0172106 A1 | 8/2005 | Ford et al. |
| 2006/0072847 A1 | 4/2006 | Chor et al. |
| 2006/0224533 A1 | 10/2006 | Thaler |
| 2006/0280364 A1 | 12/2006 | Ma et al. |
| 2007/0255903 A1 | 11/2007 | Tsadik |
| 2007/0271407 A1* | 11/2007 | Yap .................. G06F 9/383 712/E9.047 |
| 2008/0209135 A1 | 8/2008 | Clark et al. |
| 2009/0016571 A1 | 1/2009 | Tijerina et al. |
| 2009/0113182 A1 | 4/2009 | Abernathy et al. |
| 2009/0192958 A1 | 7/2009 | Todorokihara |
| 2010/0017351 A1 | 1/2010 | Hench |
| 2010/0118157 A1 | 5/2010 | Kameyama |
| 2011/0029471 A1 | 2/2011 | Chakradhar et al. |
| 2011/0239032 A1 | 9/2011 | Kato et al. |
| 2011/0307681 A1 | 12/2011 | Piry et al. |
| 2012/0017066 A1 | 1/2012 | Vorbach et al. |
| 2012/0109915 A1 | 5/2012 | Kamekawa |
| 2012/0110491 A1 | 5/2012 | Cheung |
| 2012/0134595 A1 | 5/2012 | Fonseca et al. |
| 2012/0278376 A1 | 11/2012 | Bakos |
| 2012/0323832 A1 | 12/2012 | Snook et al. |
| 2013/0159665 A1 | 6/2013 | Kashyap |
| 2014/0046995 A1 | 2/2014 | Ranous |
| 2014/0089232 A1 | 3/2014 | Buibas et al. |
| 2014/0115224 A1* | 4/2014 | Sanghai ............... G06F 9/3824 710/317 |
| 2014/0115278 A1 | 4/2014 | Redford |
| 2014/0142929 A1 | 5/2014 | Seide et al. |
| 2014/0180989 A1 | 6/2014 | Krizhevsky et al. |
| 2014/0277718 A1 | 9/2014 | Tzhikevich et al. |
| 2014/0351190 A1 | 11/2014 | Levin et al. |
| 2015/0046332 A1 | 2/2015 | Adjaoute |
| 2015/0067273 A1 | 3/2015 | Strauss et al. |
| 2015/0104102 A1 | 4/2015 | Carreira et al. |
| 2015/0170021 A1 | 6/2015 | Lupon et al. |
| 2015/0199272 A1 | 7/2015 | Goel |
| 2015/0331832 A1 | 11/2015 | Minoya |
| 2016/0085721 A1 | 3/2016 | Abali |
| 2016/0132786 A1 | 5/2016 | Balan et al. |
| 2016/0328856 A1 | 11/2016 | Mannino et al. |
| 2016/0342889 A1 | 11/2016 | Thorson et al. |
| 2016/0342890 A1 | 11/2016 | Young |
| 2016/0342891 A1 | 11/2016 | Ross |
| 2016/0342892 A1 | 11/2016 | Ross |
| 2016/0342893 A1 | 11/2016 | Ross et al. |
| 2016/0351195 A1 | 12/2016 | Falik et al. |
| 2016/0364334 A1 | 12/2016 | Asaro |
| 2016/0379109 A1 | 12/2016 | Chung et al. |
| 2017/0011281 A1 | 1/2017 | Dihkman et al. |
| 2017/0017489 A1 | 1/2017 | Kimura |
| 2017/0052785 A1 | 2/2017 | Uliel |
| 2017/0060811 A1 | 3/2017 | Yang |
| 2017/0097884 A1 | 4/2017 | Werner |
| 2017/0103298 A1 | 4/2017 | Ling |
| 2017/0103299 A1 | 4/2017 | Aydonat |
| 2017/0103313 A1 | 4/2017 | Ross et al. |
| 2017/0103318 A1 | 4/2017 | Ross |
| 2017/0158134 A1 | 6/2017 | Shigemura |
| 2017/0193360 A1 | 7/2017 | Gao |
| 2017/0206434 A1 | 7/2017 | Nariyambut et al. |
| 2017/0277537 A1 | 9/2017 | Grocutt |
| 2017/0277658 A1 | 9/2017 | Pratas |
| 2018/0012411 A1 | 1/2018 | Richey et al. |
| 2018/0018590 A1 | 1/2018 | Szeto et al. |
| 2018/0032857 A1 | 2/2018 | Lele |
| 2018/0039853 A1 | 2/2018 | Liu et al. |
| 2018/0046900 A1 | 2/2018 | Dally |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0107484 A1 | 4/2018 | Sebexen |
| 2018/0121762 A1 | 5/2018 | Han et al. |
| 2018/0150081 A1 | 5/2018 | Gross et al. |
| 2018/0157961 A1 | 6/2018 | Henry |
| 2018/0157962 A1 | 6/2018 | Henry |
| 2018/0157966 A1 | 6/2018 | Henry |
| 2018/0189633 A1 | 7/2018 | Henry |
| 2018/0189639 A1 | 7/2018 | Henry |
| 2018/0189640 A1 | 7/2018 | Henry |
| 2018/0189649 A1 | 7/2018 | Naranyan |
| 2018/0189651 A1 | 7/2018 | Henry |
| 2018/0197067 A1 | 7/2018 | Mody |
| 2018/0211403 A1 | 7/2018 | Hotson et al. |
| 2018/0218260 A1 | 8/2018 | Brand |
| 2018/0247180 A1 | 8/2018 | Cheng |
| 2018/0260220 A1 | 9/2018 | Lacy |
| 2018/0307438 A1 | 10/2018 | Huang |
| 2018/0307783 A1 | 10/2018 | Hah |
| 2018/0308012 A1 | 10/2018 | Mummadi et al. |
| 2018/0314878 A1 | 11/2018 | Lee et al. |
| 2018/0315153 A1 | 11/2018 | Park |
| 2018/0336164 A1 | 11/2018 | Phelps |
| 2018/0357511 A1 | 12/2018 | Misra et al. |
| 2018/0374105 A1 | 12/2018 | Azout et al. |
| 2019/0011551 A1 | 1/2019 | Yamamoto |
| 2019/0023277 A1 | 1/2019 | Roger et al. |
| 2019/0025773 A1 | 1/2019 | Yang et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0088948 A1 | 3/2019 | Rasale |
| 2019/0095780 A1 | 3/2019 | Zhong et al. |
| 2019/0095946 A1 | 3/2019 | Azout et al. |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0158784 A1 | 5/2019 | Ahn et al. |
| 2019/0179870 A1 | 6/2019 | Bannon |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |

(56) References Cited

U.S. PATENT DOCUMENTS

| | | |
|---|---|---|
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0311253 A1 | 10/2019 | Chung |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370645 A1 | 12/2019 | Lee |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034148 A1 | 1/2020 | Sumbu |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | Englard et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210175 A1 | 7/2020 | Alexander et al. |
| 2020/0210187 A1 | 7/2020 | Alexander et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242511 A1 | 7/2020 | Kale et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |

(56) References Cited

U.S. PATENT DOCUMENTS

| | | |
|---|---|---|
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0048984 A1 | 2/2021 | Bannon |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |
| 2021/0089316 A1 | 3/2021 | Rash et al. |
| 2021/0132943 A1 | 5/2021 | Valentine et al. |
| 2022/0188123 A1 | 6/2022 | Talpes et al. |
| 2023/0115874 A1 | 4/2023 | Das Sarma |
| 2023/0195458 A1 | 6/2023 | Das Sarma |
| 2023/0305808 A1 | 9/2023 | Bannon |
| 2024/0126547 A1 | 4/2024 | Das Sarma |

FOREIGN PATENT DOCUMENTS

| | | |
|---|---|---|
| CA | 2769788 | 9/2012 |
| CN | 110599537 A | 12/2010 |
| CN | 102541814 | 7/2012 |
| CN | 102737236 A | 10/2012 |
| CN | 102771176 | 11/2012 |
| CN | 102804135 | 11/2012 |
| CN | 103198512 | 7/2013 |
| CN | 103366339 A | 10/2013 |
| CN | 104835114 A | 8/2015 |
| CN | 103236037 B | 5/2016 |
| CN | 103500322 B | 8/2016 |
| CN | 106250103 | 12/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |

(56) References Cited

FOREIGN PATENT DOCUMENTS

| | | | |
|---|---|---|---|
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130821 A1 | 6/2020 |
| DE | 102019008316 A1 | 8/2020 |
| EP | 0 422 348 | 4/1991 |
| EP | 0 586 025 | 3/1994 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |
| EP | 2618559 B1 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 04-295953 | 10/1992 |
| JP | 10-143494 | 5/1998 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2010-079840 | 4/2010 |
| JP | 2015004922 A | 1/2015 |
| JP | 2015-056124 | 3/2015 |
| JP | 5863536 B2 | 2/2016 |
| JP | 6044134 B2 | 12/2016 |
| JP | 6525707 B2 | 6/2019 |
| JP | 2019101535 A | 6/2019 |
| JP | 2020101927 A | 7/2020 |

(56) References Cited

FOREIGN PATENT DOCUMENTS

| | | |
|---|---|---|
| JP | 2020173744 A | 10/2020 |
| KR | 100326702 B1 | 2/2002 |
| KR | 10-2008-0042818 | 5/2008 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 94/10638 | 5/1994 |
| WO | WO 02/052835 | 7/2002 |
| WO | WO 14/025765 | 2/2014 |
| WO | WO 16/032398 | 3/2016 |
| WO | WO 16/048108 | 3/2016 |
| WO | WO 16/099779 | 6/2016 |
| WO | WO 16/186811 | 11/2016 |
| WO | WO 16/186823 | 11/2016 |
| WO | WO 16/207875 | 12/2016 |
| WO | WO 17/117186 | 7/2017 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |

OTHER PUBLICATIONS

Jin et al., Dec. 11, 2006, Design and implementation of floating-point multiply-accumulate processing element under SMVM System, Computer Engineering and Applications, 35:107-109.

Arima et al., Aug. 15, 1994, Recent Topics of Neurochips, System/Control/Information, 38(8):19.

Cornu et al., "Design, Implementation, and Test of a Multi-Model SYstolic Neural-Network Accelerator", Scientific Programming—Parallel Computing Projects of the Swiss Priority Programme, vol. 5, No. 1, Jan. 1, 1996.

Iwase et al., May 1, 2002, High-speed processing method in SIMD-type parallel computer, Den Journal of the Institute of Electrical Engineers of Japan C, 122-C(5):878-884.

Jouppi et al., Jun. 26, 2017, In-datacenter performance analysis of a tensor processing unit, 44th International symposium on Computer Architecture IKSCA), Toronto, Canada, 28 pp.

Kim et al., "A Large-scale Architecture for Restricted Boltzmann Machines", Department of Electrical Engineering Stanford University, 2010 18th IEEE Annual International Symposium on, IEEE, Piscataway, NJ, USA, May 2, 010.

Krizhevsky et al., "ImageNet Classification with Deep Convolutional Neural Networks", downloaded from<http://papers.nips.cc/book/advances-in-neural-information-processing-systems-25-2012>, The 26th annual conference on Neural Information Processing Systems: Dec. 3-8, 2012.

Kung S: "VLSI Array processors", IEEE ASSP Magazine, IEEE. US, vol. 2, No. 3, Jul. 1985 (1 pg).

Oxford Dictionary, Definition of synchronize, retrieved Sep. 12, 2020, https://www/lexico.com/en/definition/synchronize.

Sato et al., "An in-depth look at Google's first Tensor Processing Unit (TPU)", posted in Google Cloud Big Data and Machine Learning Blog, downloaded from internet, <URL: https://cloud.google.com/blog/big-data/>,posted May 12, 2017.

Takahashi, Aug. 2, 1989, Parallel Processing Mechanism, First Edition, Maruzen Co., Ltd., pp. 67-77, 259.

Wikipedia, Accumulator (computing), Version from Jul. 14, 2017, 4 pp.

Wikipedia, Booth's multiplication algorithm, Version from May 30, 2017, 5 pp.

International Search Report and Written Opinion dated Oct. 1, 2018, in International Patent Application No. PCT/US18/42959.

International Search Report and Written Opinion dated Sep. 10, 2018 in application No. PCT/US18/38618.

Jun Ishii et al., Jul. 2017, DNN with variable data bit width and, Institute of Electronics, Information and Communication Engineers, 117(153):137-144.

* cited by examiner

COMPUTATIONAL ARRAY MICROPROCESSOR SYSTEM USING NON-CONSECUTIVE DATA FORMATTING

CROSS REFERENCE TO OTHER APPLICATIONS

This application claims priority to U.S. Provisional Patent Application No. 62/628,212 entitled A COMPUTATIONAL ARRAY MICROPROCESSOR SYSTEM USING NON-CONSECUTIVE DATA FORMATTING filed Feb. 8, 2018, and this application claims priority to U.S. Provisional Patent Application No. 62/625,251 entitled VECTOR COMPUTATIONAL UNIT filed Feb. 1, 2018, and this application claims priority to U.S. Provisional Patent Application No. 62/536,399 entitled ACCELERATED MATHEMATICAL ENGINE filed Jul. 24, 2017, and this application is a continuation-in-part of co-pending U.S. patent application Ser. No. 15/710,433 entitled ACCELERATED MATHEMATICAL ENGINE filed Sep. 20, 2017, which claims priority to U.S. Provisional Patent Application No. 62/536, 399 entitled ACCELERATED MATHEMATICAL ENGINE filed Jul. 24, 2017, all of which are incorporated herein by reference for all purposes.

BACKGROUND OF THE INVENTION

Processing for machine learning and artificial intelligence typically requires performing mathematical operations on large sets of data and often involves solving multiple convolution layers. Applications of machine learning, such as self-driving and driver-assisted automobiles, often utilize array computational operations to calculate matrix and vector results. For example, array computational operations may be used to compute convolutional layers such as when performing image processing on captured sensor data. In many situations, a large amount of data is required to perform the necessary computational operations. Traditional implementations of these operations often require loading each element of a computational operation from a unique memory address. For a convolution operation, the process typically requires calculating an individual memory address for each element. Moreover, there is a potential to incur an additional delay from the latency involved in reading each data element from memory. These performance penalties are magnified when performing wide convolution operations that involve large input matrices and many matrix elements. Traditional solutions for performing computational operations, such as relying on multiple graphical processing unit (GPU) cores, utilize parallel processing to decrease the time spent computing. However, these solutions are limited in throughput in part due to the latency incurred by reading input data from memory. Therefore, there exists a need for a microprocessor system with increased throughput that performs array computational operations without the need to perform computationally and latency expensive operations for each of the individual elements of the input data.

BRIEF DESCRIPTION OF THE DRAWINGS

Various embodiments of the invention are disclosed in the following detailed description and the accompanying drawings.

DETAILED DESCRIPTION

Figure 1:
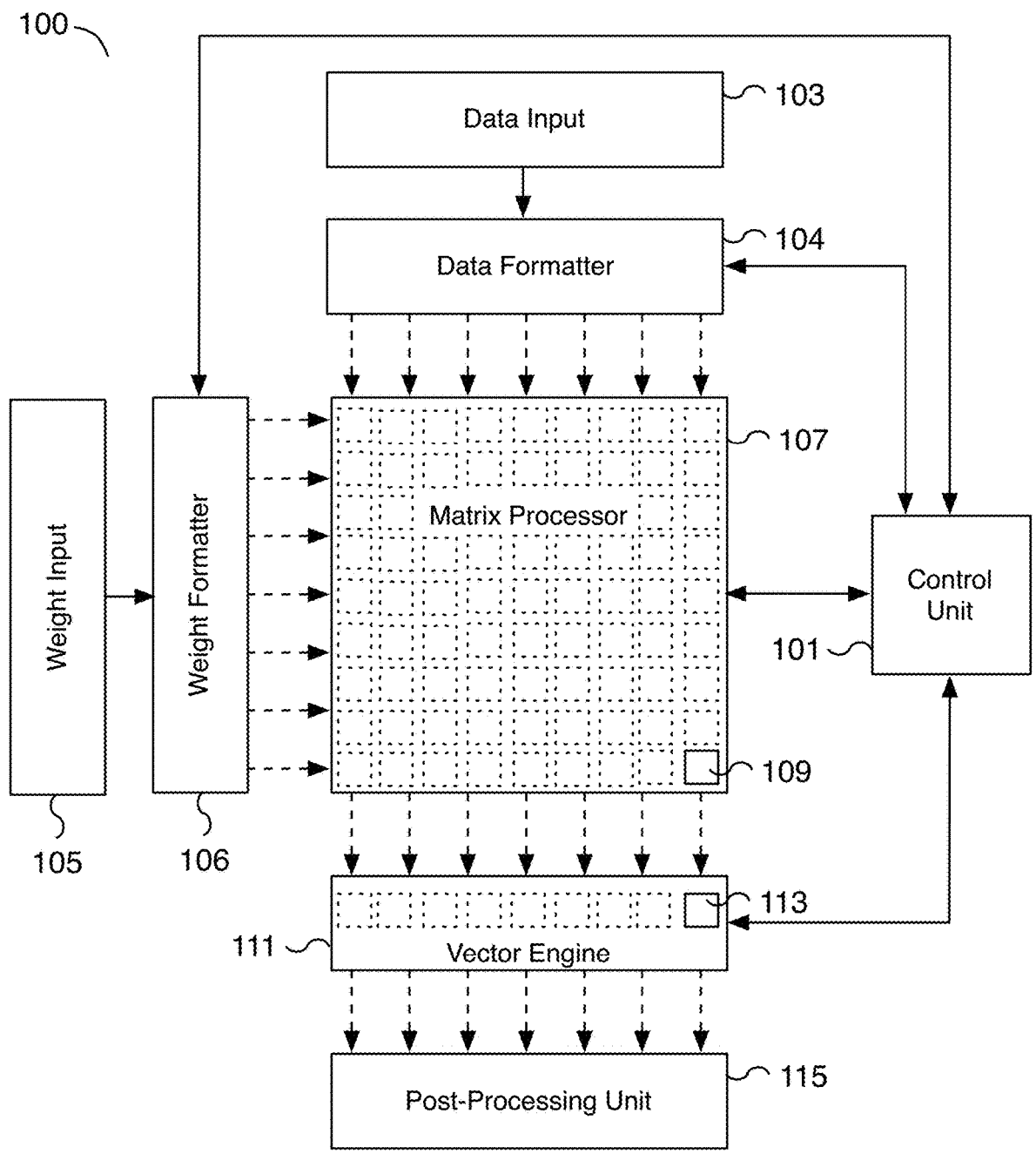
FIG. 1 is a block diagram illustrating an embodiment of a microprocessor system for performing machine learning processing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A microprocessor system for performing high throughput array computational operations is disclosed. In some embodiments, a microprocessor system includes a computational array (e.g., matrix processor) in communication with a hardware data formatter for aligning the data to minimize data reads and the latency incurred by reading input data for processing. For example, a matrix processor allows a plurality of elements of a matrix and/or vector to be loaded and processed in parallel together. Thus, using data formatted by one or more hardware data formatters, a computational operation such as a convolution operation may be performed by the computational array.

One technique includes loading a large number of consecutive elements (e.g., consecutive in memory) of a matrix/vector together and performing operations on the consecutive elements in parallel using the matrix processor. By loading consecutive elements together, a single memory load and/or cache check for the entire group of elements can be performed—allowing the entire group of elements to be loaded using minimal processing resources. However, requiring the input elements of each processing iteration of the matrix processor to be consecutive elements could potentially require the matrix processor to load a large number of matrix/vector elements that are to be not utilized. For example, performing a convolution operation using a stride greater than one requires access to matrix elements that are not consecutive. If parallel input elements to the matrix processor are required to be consecutive, each processing iteration of the matrix processor is unable to fully utilize every individual input element for workloads only requiring non-consecutive elements. An alternative technique is to not require every individual input element of the matrix processor be consecutive (e.g., every individual input element can be independently specified without regard to whether it is consecutive in memory to a previous input element). This technique incurs significant performance costs since each referenced element incurs the cost of determining its memory address and performing a cache check for the individual element with the potential of an even more expensive load from memory in the case of a cache miss.

In an embodiment of a disclosed microprocessor system, the group of input elements of a matrix processor are divided into a plurality of subsets, wherein elements within each subset are required be consecutive but the different subsets are not required to be consecutive. This allows the benefit of reduce resources required to load consecutive elements within each subset while providing the flexibility of loading non-consecutive elements across the different subsets. For example, a hardware data formatter loads multiple subsets of elements where the elements of each subset are located consecutively in memory. By loading the elements of each subset together, a memory address calculation and cache check is performed only with respect to the start and end elements of each subset. In the event of a cache miss, an entire subset of elements is loaded together from memory. Rather than incurring a memory lookup penalty on a per element basis as with the previous discussed technique, a cache check is minimized to two checks for each subset (the start and end elements) and a single memory read for the entire subset in the event of a cache miss. Computational operations on non-consecutive elements, such as the performing convolution using a stride greater than one, are more efficient since the memory locations of the subsets need not be consecutively located in memory. Using the disclosed system and techniques, computational operations may be performed on non-consecutive elements with increased throughput and a high clock frequency.

In various embodiments, a computational array performs matrix operations involving input vectors and includes a plurality of computation units to receive M operands and N operands from the input vectors. Using a sequence of input vectors, a computational array may perform matrix operations such as a matrix multiplication. In some embodiments, the computation units are sub-circuits that include an arithmetic logic unit, an accumulator, a shadow register, and a shifter for performing operations such as generating dot-products and various processing for convolution. Unlike conventional graphical processing unit (GPU) or central processing unit (CPU) processing cores, where each core is configured to receive its own unique processing instruction, the computation units of the computational array each perform the same computation in parallel in response to an individual instruction received by the computational array.

In various embodiments, the data input to the computational array is prepared using a hardware data formatter. For example, a hardware data formatter is utilized to load and align data elements using subsets of elements where the elements of each subset are located consecutively in memory and the subsets need not be located consecutively in memory. In various embodiments, the various subsets may each have a memory location independent from other subsets. For example, the different subsets may be located non-consecutively in memory from one another. By restricting the data elements within a subset to consecutive data, multiple consecutive data elements are processed together, which minimizes the calculations and delay incurred when preparing the data for a computational array. For example, a subset of data elements may be cached as a consecutive sequence of data elements by performing a cache check on the start and end element and, in the event of a cache miss on either element, a single data read to load the entire subset from memory into a memory cache. Once all the data elements are available, the data may be provided together to the computational array as a group of values to be processed in parallel.

In some embodiments, a microprocessor system comprises a computational array and a hardware data formatter. For example, a microprocessor system includes a matrix processor capable of performing matrix and vector operations. In various embodiments, the computational array includes a plurality of computation units. For example, the computation units may be sub-circuits of a matrix processor that include the functionality for performing one or more multiply, add, accumulate, and shift operations. As another example, computation units may be sub-circuits that include the functionality for performing a dot-product operation. In various embodiments, the computational array includes a sufficient number of computation units for performing multiple operations on the data inputs in parallel. For example, a computational array configured to receive M operands and N operands may include at least M×N computation units. In various embodiments, each of the plurality of computation units operates on a corresponding value formatted by a hardware data formatter and the values operated by the plurality of computation units are synchronously provided together to the computational array as a group of values to be processed in parallel. For example, values corresponding to elements of a matrix are processed by one or more hardware data formatters and provided to the computational array together as a group of values to be processing in parallel.

In various embodiments, a hardware data formatter is configured to gather the group of values to be processed in parallel by the computational array. For example, a hardware data formatter retrieves the values from memory, such as static random access memory (SRAM), via a cache. In some embodiments, in the event of a cache miss, the hardware data formatter loads the values into the cache from memory and subsequently retrieves the values from the cache. In various embodiments, the values provided to the computational array correspond to computational operands. For example, a hardware formatter may process M operands as an input vector to a computational array. In various embodiments, a second hardware formatter may process N operands as a second input vector to the computational array. In some embodiments, each hardware data formatter processes a group of values synchronously provided together to the computational array, where each group of values includes a first subset of values located consecutively in memory and a second subset of values located consecutively in memory, yet the first subset of values are not located consecutively in the memory from the second subset of values. For example, a hardware data formatter loads a first subset of values stored consecutively in memory and a second subset of values also stored consecutively in memory but with a gap in memory between the two subsets of values. Each subset of values is loaded as consecutive values into the hardware data formatter. To prepare an entire vector of inputs for a computational array, the hardware data formatter performs loads based on the number of subsets instead of based on the total number of elements needed for an input operand to a computational array.

FIG. 1 is a block diagram illustrating an embodiment of a microprocessor system for performing machine learning processing. In the example shown, microprocessor system 100 includes control unit 101, data input 103, data formatter 104, weight input 105, weight formatter 106, matrix processor 107, vector engine 111, and post-processing unit 115. Data input 103 and weight input 105 are input data that is fed to hardware data formatters data formatter 104 and weight formatter 106. In some embodiments, data input 103 and/or weight input 105 are retrieved from a memory (not shown), which may include a memory cache or buffer to reduce latency when reading data. In the example shown, data formatter 104 and weight formatter 106 are hardware data formatters for preparing data for matrix processor 107. In some embodiments, data formatter 104 and weight formatter 106 include a logic circuit for preparing data for matrix processor 107 and/or a memory cache or buffer for storing and processing input data. For example, data formatter 104 may prepare N operands from a two-dimensional array retrieved from data input 103 that correspond to image data. Weight formatter 106 may prepare M operands retrieved from weight input 105 that correspond to a vector of weight values. Data formatter 104 and weight formatter 106 prepare the N and M operands to be processed by matrix processor 107. In some embodiments, microprocessor system 100, including at least hardware data formatters data formatter 104 and weight formatter 106, matrix processor 107, vector engine 111, and post-processing unit 115, perform the processes described below with respect to FIGS. 2, 3, 7, and 8.

In some embodiments, matrix processor 107 is a computational array that includes a plurality of computation units. For example, a matrix processor receiving M operands and N operands from weight formatter 106 and data formatter 104, respectively, includes M×N computation units. In the figure shown, the small squares inside matrix processor 107 depict that matrix processor 107 includes a logical two-dimensional array of computation units. Computation unit 109 is one of a plurality of computation units of matrix processor 107. In some embodiments, each computation unit is configured to receive one operand from data formatter 104 and one operand from weight formatter 106. In some embodiments, the computation units are configured according to a logical two-dimensional array but the matrix processor is not necessarily fabricated with computation units laid out as a physical two-dimensional array. For example, the i-th operand of data formatter 104 and the j-th operand of weight formatter 106 are configured to be processed by the i-th×j-th computation unit of matrix processor 107.

In various embodiments, the data width of components data formatter 104, weight formatter 106, matrix processor 107, vector engine 111, and post-processing unit 115 are wide data widths and include the ability to transfer more than one operand in parallel. In some embodiments, data formatter 104 and weight formatter 106 are each 96-bytes wide. In some embodiments, data formatter 104 is 192-bytes wide and weight formatter 106 is 96-bytes wide. In various embodiments, the width of data formatter 104 and weight formatter 106 is dynamically configurable. For example, data formatter 104 may be dynamically configured to 96 or 192 bytes and weight formatter 106 may be dynamically configured to 96 or 48 bytes. In some embodiments, the dynamic configuration is controlled by control unit 101. In various embodiments, a data width of 96 bytes allows 96 operands to be processed in parallel. For example, in an embodiment with data formatter 104 configured to be 96-bytes wide, data formatter 104 can transfer 96 operands to matrix processor 107 in parallel.

In various embodiments, data input 103 and weight input 105 are input data to corresponding hardware data formatters data formatter 104 and weight formatter 106 based on memory addresses calculated by the hardware data formatters. In some embodiments, data formatter 104 and/or weight formatter 106 retrieves via data input 103 and weight input 105, respectively, a stream of data corresponding to one or more subsets of values stored consecutively in memory. Data formatter 104 and/or weight formatter 106 may retrieve one or more subsets of values stored consecutively in memory and prepare the data as input values for matrix processor 107. In various embodiments, the one or more subsets of values are not themselves stored consecutively in memory with other subsets of values. In some embodiments, data input 103 and/or weight input 105 are retrieved from memory (not shown in FIG. 1) that contains a single read port. In some embodiments, the memory contains a limited number of read ports and the number of read ports is fewer than the data width of components data formatter 104, weight formatter 106, matrix processor 107, vector engine 111, and/or post-processing unit 115. In some embodiments, the memory includes a cache and a hardware data formatter, such as data formatter 104 and weight formatter 106, which will perform a cache check to determine whether each subset of values is in the cache prior to issuing a read request to memory. In the event the subset of values is cached, a hardware data formatter (e.g., data formatter 104 or weight formatter 106) will retrieve the data from the cache. In various embodiments, in the event of a cache miss, the hardware data formatter (e.g., data formatter 104 or weight formatter 106) will retrieve the entire subset of values from memory and populate the cache with the retrieved values.

In various embodiments, matrix processor 107 is configured to receive N bytes from data formatter 104 and M bytes from weight formatter 106 and includes at least M×N computation units. For example, matrix processor 107 may be configured to receive 96 bytes from data formatter 104 and 96 bytes from weight formatter 106 and includes at least 96×96 computation units. As another example, matrix processor 107 may be configured to receive 192 bytes from data formatter 104 and 48 bytes from weight formatter 106 and includes at least 192×48 computation units. In various embodiments, the dimensions of matrix processor 107 may be dynamically configured. For example, the default dimensions of matrix processor 107 may be configured to receive 96 bytes from data formatter 104 and 96 bytes from weight formatter 106 but the input dimensions may be dynamically configured to 192 bytes and 48 bytes, respectively. In various embodiments, the output size of each computation unit is equal to or larger than the input size. For example, in some embodiments, the input to each computation unit is two 1-byte operands, one corresponding to an operand from data formatter 104 and one from weight formatter 106, and the output of processing the two operands is a 4-byte result. As another example, matrix processor 107 may be configured to receive 96 bytes from data formatter 104 and 96 bytes from weight formatter 106 and output 96 4-byte results. In some embodiments, the output of matrix processor 107 is a vector. For example, a matrix processor configured to receive two 96-wide input vectors, where each element (or operand) of the input vector is one byte in size, can output a 96-wide vector result where each element of the vector result is 4-bytes in size.

In various embodiments, each computation unit of matrix processor 107 is a sub-circuit that includes an arithmetic logic unit, an accumulator, and a shadow register. In the example shown, the computation units of matrix processor 107 can perform an arithmetic operation on the M operands and N operands from weight formatter 106 and data formatter 104, respectively. In various embodiments, each computation unit is configured to perform one or more multiply, add, accumulate, and/or shift operations. In some embodiments, each computation unit is configured to perform a dot-product operation. For example, in some embodiments, a computation unit may perform multiple dot-product component operations to calculate a dot-product result. For example, the array of computation units of matrix processor 107 may be utilized to perform convolution steps required for performing inference using a machine learning model. A two-dimensional data set, such as an image, may be formatted and fed into matrix processor 107 using data formatter 104 and data input 103, one vector at a time. In parallel, a filter of weights may be applied to the two-dimensional data set by formatting the weights and feeding them as a vector into matrix processor 107 using weight formatter 106 and weight input 105. Corresponding computation units of matrix processor 107 perform a matrix processor instruction on the corresponding operands of the weight and data inputs in parallel.

In some embodiments, vector engine 111 is a vector computational unit that is communicatively coupled to matrix processor 107. Vector engine 111 includes a plurality of processing elements including processing element 113. In the figure shown, the small squares inside vector engine 111 depict that vector engine 111 includes a plurality of processing elements arranged as a vector. In some embodiments, the processing elements are arranged in a vector in the same direction as data formatter 104. In some embodiments, the processing elements are arranged in a vector in the same direction as weight formatter 106. In various embodiments, the data size of the processing elements of vector engine 111 is the same size or larger than the data size of the computation units of matrix processor 107. For example, in some embodiments, computation unit 109 receives two operands each 1 byte in size and outputs a result 4 bytes in size. Processing element 113 receives the 4-byte result from computation unit 109 as an input 4 bytes in size. In various embodiments, the output of vector engine 111 is the same size as the input to vector engine 111. In some embodiments, the output of vector engine 111 is smaller in size compared to the input to vector engine 111. For example, vector engine 111 may receive up to 96 elements each 4 bytes in size and output 96 elements each 1 byte in size. As described above, in some embodiments, the communication channel from data formatter 104 and weight formatter 106 to matrix processor 107 is 96-elements wide with each element 1 byte in size and matches the output size of vector engine 111 (96-elements wide with each element 1 byte in size).

In some embodiments, the processing elements of vector engine 111, including processing element 113, each include an arithmetic logic unit (ALU) (not shown). For example, in some embodiments, the ALU of each processing element is capable of performing arithmetic operations. In some embodiments, each ALU of the processing elements is capable of performing in parallel a rectified linear unit (ReLU) function and/or scaling functions. In some embodiments, each ALU is capable of performing a non-linear function including non-linear activation functions. In various embodiments, each processing element of vector engine 111 includes one or more flip-flops for receiving input operands. In some embodiments, each processing element has access to a slice of a vector engine accumulator and/or vector registers of vector engine 111. For example, a vector engine capable of receiving 96-elements includes a 96-element wide accumulator and one or more 96-element vector registers. Each processing element has access to a one-element slice of the accumulator and/or vector registers. In some embodiments, each element is 4-bytes in size. In various embodiments, the accumulator and/or vector registers are sized to fit at least the size of an input data vector. In some embodiments, vector engine 111 includes additional vector registers sized to fit the output of vector engine 111.

In some embodiments, the processing elements of vector engine 111 are configured to receive data from matrix processor 107 and each of the processing elements can process the received portion of data in parallel. As one example of a processing element, processing element 113 of vector engine 111 receives data from computation unit 109 of matrix processor 107. In various embodiments, vector engine 111 receives a single vector processor instruction and in turn each of the processing elements performs the processor instruction in parallel with the other processing elements. In some embodiments, the processor instruction includes one or more component instructions, such as a load, a store, and/or an arithmetic logic unit operation. In various embodiments, a no-op operation may be used to replace a component instruction.

In the example shown, the dotted arrows between data formatter 104 and matrix processor 107, weight formatter 106 and matrix processor 107, matrix processor 107 and vector engine 111, and vector engine 111 and post-processing unit 115 depict couplings between the respective pairs of components that are capable of sending multiple data elements such as a vector of data elements. As an example, the communication channel between matrix processor 107 and vector engine 111 may be 96×32 bits wide and support transferring 96 elements in parallel where each element is 32 bits in size. As another example, the communication channel between vector engine 111 and post-processing unit 115 may be 96×1 byte wide and support transferring 96 elements in parallel where each element is 1 byte in size. In various embodiments, data input 103 and weight input 105 are retrieved from a memory module (not shown in FIG. 1). In some embodiments, vector engine 111 is additionally coupled to a memory module (not shown in FIG. 1) and may receive input data from the memory module in addition or alternatively to input from matrix processor 107. In the various embodiments, a memory module is typically a static random access memory (SRAM).

In some embodiments, one or more computation units of matrix processor 107 may be grouped together into a lane such that matrix processor 107 has multiple lanes. In various embodiments, the lanes of matrix processor 107 may be aligned with either data formatter 104 or weight formatter 106. For example, a lane aligned with weight formatter 106 includes a set of computation units that are configured to receive as input every operand of weight formatter 106. Similarly, a lane aligned with data formatter 104 includes a set of computation units that are configured to receive as input every operand of data formatter 104. In the example shown in FIG. 1, the lanes are aligned along weight formatter 106 in a vertical column and each lane feeds to a corresponding lane of vector engine 111. In some embodiments, each lane is a vertical column of sub-circuits that include multiply, add and/or accumulate, and shift functionality. In some embodiments, matrix processor 107 includes a matrix of tiles and each tile is a matrix of computation units. For example, a 96×96 matrix processor may include a matrix of 6×6 tiles, where each tile includes 16×16 computation units. In some embodiments, a vertical lane is a single column of tiles. In some embodiments, a horizontal lane is a single row of tiles. In various embodiments, the dimensions of the lane may be configured dynamically and may be utilized for performing alignment operations on the input to matrix processor 107, vector engine 111, and/or post-processing unit 115. In some embodiments, the dynamic configuration is performed by or using control unit 101 and/or with using processor instructions and/or control signals controlled by control unit 101.

In some embodiments, control unit 101 synchronizes the processing performed by data formatter 104, weight formatter 106, matrix processor 107, vector engine 111, and post-processing unit 115. For example, control unit 101 may send processor specific control signals and/or instructions to each of data formatter 104, weight formatter 106, matrix processor 107, vector engine 111, and post-processing unit 115. In some embodiments, a control signal is utilized instead of a processor instruction. Control unit 101 may send matrix processor instructions to matrix processor 107. A matrix processor instruction may be a computational array instruction that instructs a computational array to perform an arithmetic operation, such as a dot-product or dot-product component, using specified operands from data input 103 and/or weight input 105 that are formatted by data formatter 104 and/or weight formatter 106, respectively. Control unit 101 may send vector processor instructions to vector engine 111. For example, a vector processor instruction may include a single processor instruction with a plurality of component instructions to be executed together by the vector computational unit. Control unit 101 may send post-processing instructions to post-processing unit 115. In various embodiments, control unit 101 synchronizes data that is fed to matrix processor 107 from data formatter 104 and weight formatter 106, to vector engine 111 from matrix processor 107, and to post-processing unit 115 from vector engine 111. In some embodiments, control unit 101 synchronizes the data between different components of microprocessor system 100 including between data formatter 104, weight formatter 106, matrix processor 107, vector engine 111, and/or post-processing unit 115 by utilizing processor specific memory, queue, and/or dequeue operations and/or control signals. In some embodiments, data and instruction synchronization is performed by control unit 101. In some embodiments, data and instruction synchronization is performed by control unit 101 that includes one or more sequencers to synchronize processing between data formatter 104, weight formatter 106, matrix processor 107, vector engine 111, and/or post-processing unit 115.

In some embodiments, data input 103, data formatter 104, weight input 105, weight formatter 106, matrix processor 107, and vector engine 111 are utilized for processing convolution layers. For example, matrix processor 107 may be used to perform calculations associated with one or more convolution layers of a convolution neural network. Data formatter 104 and weight formatter 106 may be utilized to prepare matrix and/or vector data in a format for processing by matrix processor 107. Data input 103 may include image data such as one or more image channels captured by sensors (not shown), where sensors include, as an example, cameras mounted to a vehicle. Weight input 105 may include weights determined by training a machine learning model for autonomous driving. In some embodiments, vector engine 111 is utilized for performing non-linear functions such as an activation function on the output of matrix processor 107. For example, matrix processor 107 may be used to calculate a dot-product and vector engine 111 may be used to perform an activation function such as a rectified linear unit (ReLU) or sigmoid function. In some embodiments, post-processing unit 115 is utilized for performing pooling operations. In some embodiments, post-processing unit 115 is utilized for formatting and storing the processed data to memory and may be utilized for synchronizing memory writing latency.

Figure 2:
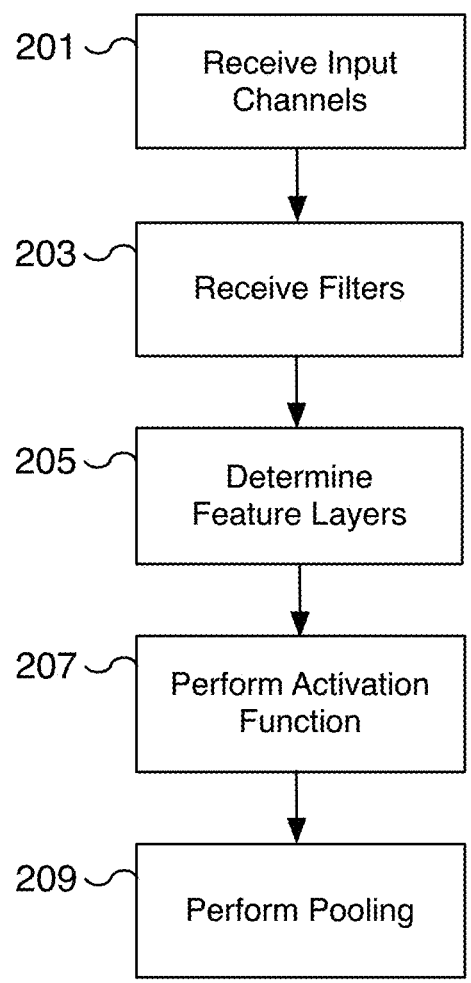
FIG. 2 is a flow diagram illustrating an embodiment of a process for performing machine learning processing.

FIG. 2 is a flow diagram illustrating an embodiment of a process for performing machine learning processing. In some embodiments, the process of FIG. 2 is utilized to implement a convolutional neural network using sensor input data such as images and learned weights. In various embodiments, the process of FIG. 2 may be repeated for multiple convolution layers by using the output of the process of FIG. 2 as the input for the next convolution layer. In some embodiments, the processing is performed in the context of self-driving or driver-assisted vehicles to identify objects in a scene such as street signs, vehicles, pedestrians, and lane markers, among other objects. Other sensor data, including non-image sensor data, such as ultrasonic, radar, and LiDAR, may also be utilized as input data. In various embodiments, the process of FIG. 2 utilizes a microprocessor system such as is microprocessor system 100 of FIG. 1.

At 201, input channels are received as input data to the microprocessor system. For example, vision data is captured using sensors and may include one or more channels corresponding to different color channels for the colors red, green, and blue. In various embodiments, multiple channels may be utilized as the different channels may contain different forms of information. As another example, non-sensor data may be utilized as input data. In various embodiments, the input channels may be loaded from memory via a cache using subsets of consecutively stored data in memory. In some embodiments, the input channels may be retrieved and/or formatted for processing using a hardware data formatter such as data formatter 104 of FIG. 1.

At 203, one or more filters are received for processing the input channels. For example, a filter in the form of a matrix contains learned weights and is used to identify activations in the channels. In some embodiments, the filter is a square matrix kernel smaller than the input channel. In various embodiments, filters may be utilized to identify particular shapes, edges, lines, and other features and/or activations in the input data. In some embodiments, the filters and associated weights that make up the filter are created by training a machine learning model using a training corpus of data similar to the input data. In various embodiments, the received filters may be streamed from memory. In some embodiments, the filters may be retrieved and/or formatted for processing using a hardware data formatter such as weight formatter 106 of FIG. 1.

At 205, one or more feature layers are determined using the received input channels and filters. In various embodiments, the feature layers are determined by performing one or more convolution operations using a computational array such as matrix processor 107 of FIG. 1. In some embodiments, the one or more output feature layers are determined by repeatedly performing a dot-product between different small regions of an input channel and the weights of the filter. In various embodiments, each filter is used to create a single feature layer by performing a two-dimensional convolution using the filter. In some embodiments, the input data is padded to adjust for the size of the output feature layer. In various embodiments, a stride parameter is utilized and may impact the size of the output feature layer. In various embodiments, a bias parameter may be utilized. For example, a bias term may be added to the resulting values of convolution for each element of a feature layer.

At 207, an activation function is performed on one or more feature layers. For example, an element-wise activation function, such as a rectified linear unit (ReLU) function, is performed using a vector processor such as vector engine 111 of FIG. 1 to create an activation layer. In various embodiments, different activation functions, such as a non-linear activation function, including ReLU and sigmoid, may be utilized to create an activation layer for each feature layer.

At 209, pooling is performed on the activation layers created at 207. For example, a pooling layer is generated by a post-processing unit such as post-processing unit 115 of FIG. 1 using the activation layer generated at 207. In some embodiments, the pooling layer is generated to down sample the activation layer. In various embodiments, different filter sizes may be utilized to create a pooling layer based on the desired output size. In various embodiments, different pooling techniques, such as maxpooling, are utilized. In various embodiments, pooling parameters include kernel size, stride, and/or spatial extent, among others. In some embodiments, the pooling layer is an optional layer and may be implemented when appropriate.

In various embodiments, the process of FIG. 2 is utilized for each layer of a convolution neural network (CNN). Multiple passes of the process of FIG. 2 may be utilized to implement a multi-layer CNN. For example, the output of 209 may be utilized as input channels at 201 to calculate output layers of an intermediate layer. In some embodiments, a CNN is connected to one or more additional non-CNN layers for classification, object detection, object segmentation, and/or other appropriate goals. In some embodiments, the additional non-CNN layers are implemented using a microprocessor system such as is microprocessor system 100 of FIG. 1.

Figure 3:
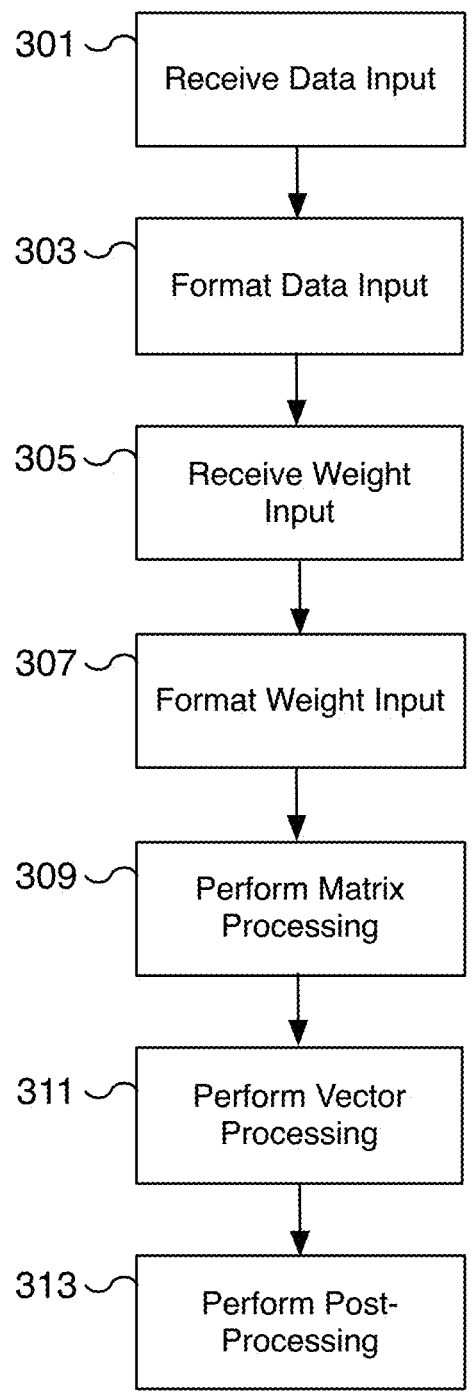
FIG. 3 is a flow diagram illustrating an embodiment of a process for performing machine learning processing.

FIG. 3 is a flow diagram illustrating an embodiment of a process for performing machine learning processing. In some embodiments, the process of FIG. 3 is utilized to perform inference on sensor data by performing computational operations, such as convolution operations, and element-wise activation functions. In some embodiments, the process of FIG. 3 is performed using a microprocessor system such as is microprocessor system 100 of FIG. 1. In various embodiments, steps 301 and 303 are performed at 201 of FIG. 2 using data input 103 and data formatter 104 of FIG. 1, steps 305 and 307 are performed at 203 of FIG. 2 using weight input 105 and weight formatter 106 of FIG. 1, step 309 is performed at 205 of FIG. 2 using matrix processor 107 of FIG. 1, step 311 is performed at 207 of FIG. 2 using vector engine 111 of FIG. 1, and step 313 is performed at 209 of FIG. 2 using post-processing unit 115 of FIG. 1.

At 301, data input is received. For example, data input corresponding to sensor data is received by a hardware data formatter for formatting. In some embodiments, data input is data input 103 of FIG. 1 and is received by data formatter 104 of FIG. 1. In various embodiments, a hardware data formatter requests the data input from memory as read requests based on subsets of values stored consecutively in memory. For example, a hardware data formatter may first check a cache of the memory for the requested data values and in the event of a cache miss, the read request will retrieve the data values from memory. In various embodiments, checking for a cache hit or miss requires calculating the start address and end address of the subset of requested data values. In some embodiments, a data request populates the cache with the requested values along with additional data to fill a cache line. In some embodiments, the data is streamed in from memory and may bypass the cache.

At 303, data input is formatted using a hardware data formatter. For example, a hardware data formatter such as data formatter 104 of FIG. 1 formats the received data input for processing by a computational array such as matrix processor 107 of FIG. 1. The hardware data formatter may format the received data input into an input vector of operands for a computational array. In some embodiments, the hardware data formatter further performed the requesting of data received at 301. In some embodiments, the hardware data formatter will format at least one of the operands of a convolution operation. For example, each two-dimensional region corresponding to an input channel of vision data for a convolution operation involving a filter will be formatted by the hardware data formatter into a vector operand for the computational array. The vectors corresponding to the regions are grouped together by their n-th elements and fed to the computation array at a rate of at most one element from each vector per clock cycle. In some embodiments, the hardware data formatter will select the appropriate elements for performing convolution of a filter with the data input by formatting each region of the data input into a vector and feeding each element of the appropriate vector to a corresponding computation unit of a computational array. In some embodiments, a bias parameter is introduced using the hardware data formatter.

At 305, weight input is received. For example, weight input corresponding to machine learning weights of a filter are received by a hardware data formatter for formatting. In some embodiments, weight input is weight input 105 of FIG. 1 and is received by weight formatter 106 of FIG. 1. In various embodiments, a hardware data formatter requests the weight input from memory as read requests based on subsets of values stored consecutively in memory. For example, a hardware data formatter may first check a cache of the memory for the requested weight values and in the event of a cache miss, the read request will retrieve the weight values from memory. In various embodiments, checking for a cache hit or miss requires calculating the start address and end address of the subset of requested weight values. In some embodiments, a weight data request populates the cache with the requested weight values. In some embodiments, the data for weights is streamed in from memory and may bypass the cache. In some embodiments, the weight input includes a bias parameter.

At 307, weight input is formatted using a hardware data formatter. For example, a hardware data formatter such as weight formatter 106 of FIG. 1 formats the received weight input for processing by a computational array such as matrix processor 107 of FIG. 1. The hardware data formatter may format the received weight input into an input vector of operands for a computational array. In some embodiments, the hardware data formatter further performed the requesting of data received at 305. In some embodiments, the hardware data formatter will format at least one of the operands of a convolution operation. For example, a filter for a convolution operation will be formatted by the hardware data formatter into a vector operand for the computational array. In some embodiments, the hardware data formatter will select the appropriate elements for performing convolution of a filter with the data input by formatting the filter into a vector and feeding each element of the vector to a corresponding computation unit of a computational array. In some embodiments, a bias parameter is introduced using the hardware data formatter.

At 309, matrix processing is performed. For example, the operands formatted at 303 and 307 are received by each of the computation units of a computational array for processing. In some embodiments, the matrix processing is performed using a matrix processor such as matrix processor 107 of FIG. 1. In some embodiments, a dot-product is performed at each appropriate computation unit of the computational array using respective vectors received by hardware data formatters such as data formatter 104 and weight formatter 106 of FIG. 1. In some embodiments, only a subset of the matrix processor's computation units is utilized. For example, a computational array with 96×96 computation units may utilize only 64×64 computation units in the event the data input is 64 vectors and the weight input is 64 vectors. In various embodiments, the number of computation units utilized is based on the size on the data input and/or weight input. In some embodiments, the computation units each perform one or more of multiply, add, accumulate, and/or shift operations. In some embodiments, the computation units each perform one or more of multiply, add, accumulate, and/or shift operations each clock cycle. In some embodiments, a bias parameter is received and added to the calculated dot-product as part of the matrix processing performed.

At 311, vector processing is performed. For example, an element-wise activation function may be performed on the result of the matrix processing performed at 309. In some embodiments, an activation function is a non-linear activation function such as a rectified linear unit (ReLU), sigmoid, or other appropriate function. In some embodiments, the vector processor is utilized to implement scaling, normalization, or other appropriate techniques. For example, a bias parameter may be introduced to the result of a dot-product using the vector processor. In some embodiments, the result of 311 is a series of activation maps or activation layers. In some embodiments, vector processing is performed using a vector engine such as vector engine 111 of FIG. 1.

At 313, post-processing is performed. For example, a pooling layer may be implemented using a post-processing processor such as post-processing unit 115 of FIG. 1. In various embodiments, different post-processing techniques, including different pooling techniques such as maxpooling, may be implemented during the post-processing stage of 313.

In various embodiments, the process of FIG. 3 is utilized for each layer of a convolution neural network (CNN). Multiple passes of the process of FIG. 3 may be utilized to implement a multi-layer CNN. For example, the output of 313 may be utilized as data input for step 301. In some embodiments, the process of FIG. 3 must be repeated one or more times to complete a single layer. For example, in the scenario where the sensor data is larger in dimension than the number of computation units of the computational array, the sensor data may be sliced into smaller regions that fit the computational array and the process of FIG. 3 is repeated on each of the sliced regions.

Figure 4:
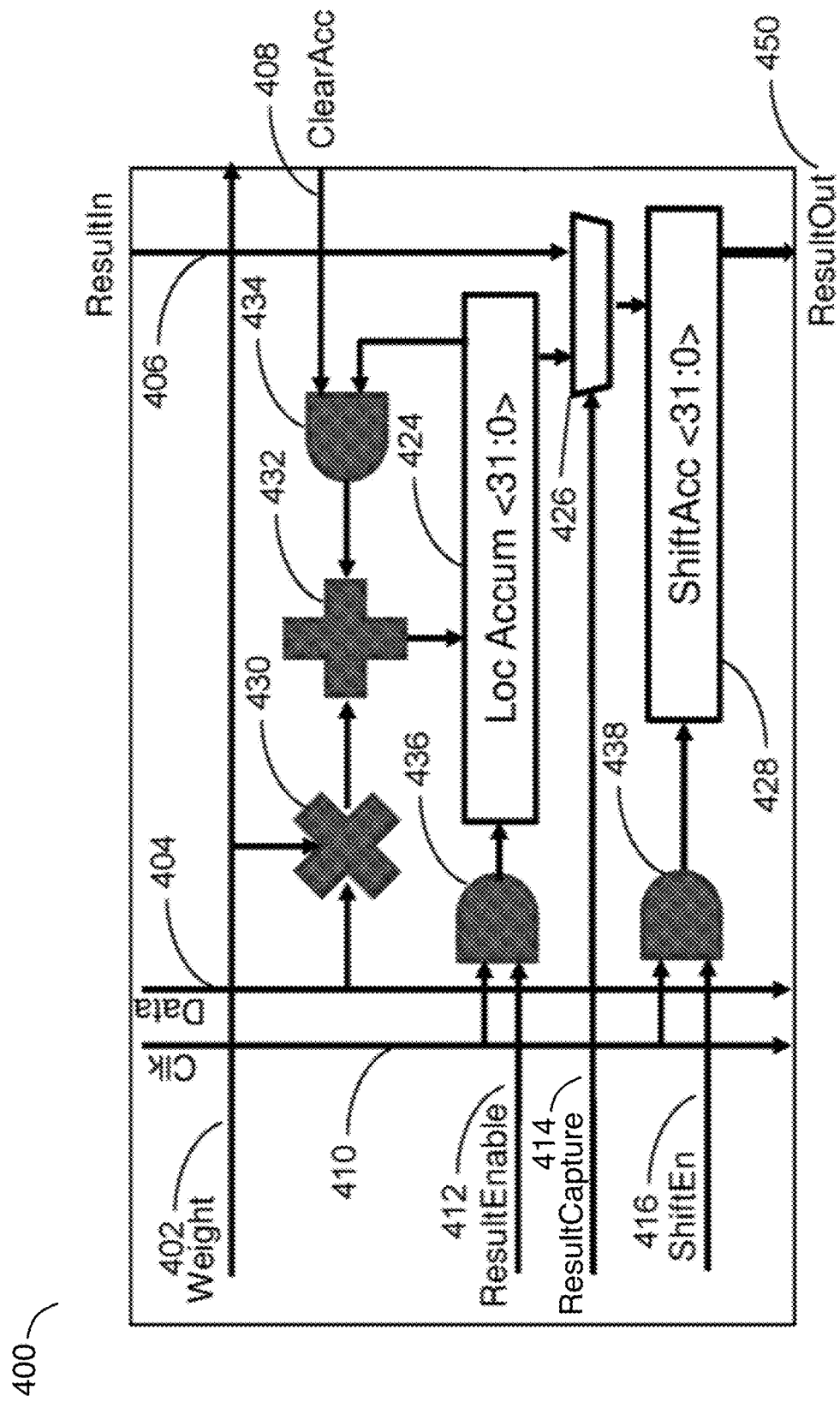
FIG. 4 is a block diagram illustrating an embodiment of a computation unit of a computational array.

FIG. 4 is a block diagram illustrating an embodiment of a computation unit of a computational array. In the example shown, computation unit 400 includes input values weight 402, data 404, and ResultIn 406; signals ClearAcc signal 408, Clock signal 410, ResultEnable signal 412, ResultCapture signal 414, and ShiftEn signal 416; components accumulator 424, multiplexer 426, shadow register 428, multiplier 430, and adder 432; logic 434, 436, and 438; and output value ResultOut 450. In some embodiments, logic 434, 436, and 438 are AND gates. In some embodiments, additional signals are included as appropriate. In various embodiments, the computation unit of FIG. 4 is repeated for each of the plurality of computation units, such as computation unit 109, of a computation array such as matrix processor 107 of FIG. 1. Computation unit 400 may be utilized to implement computational operations in parallel. In various embodiments, each computation unit of a computational array performs computations in parallel with the other computation units. In various embodiments, computation unit 400 is a sub-circuit of a matrix processor that includes the functionality for performing one or more multiply, add, accumulate, and/or shift operations. For example, computation unit 400 may be a sub-circuit that includes the functionality for performing a dot-product operation.

In some embodiments, Clock signal 410 is a clock signal received by computation unit 400. In various embodiments, each computation unit of the computational array receives the same clock signal and the clock signal is utilized to synchronize the processing of each computation unit with the other computation units.

In the example shown, multiplier 430 receives and performs a multiplication operation on the input values data 404 and weight 402. The output of multiplier 430 is fed to adder 432. Adder 432 receives and performs an addition on the output of multiplier 430 and the output of logic 434. The output of adder 432 is fed to accumulator 424. In some embodiments, input values data 404 and weight 402 are lines that cross computation units and feed the corresponding data and/or weight to neighboring computation units. For example, in some embodiments, data 404 is fed to all computation units in the same column and weight 402 is fed to all computation units in the same row. In various embodiments, data 404 and weight 402 correspond to input elements fed to computation unit 400 from a data hardware data formatter and a weight hardware data formatter, respectively. In some embodiments, the data hardware data formatter and the weight hardware data formatter are data formatter 104 and weight formatter 106 of FIG. 1, respectively.

In some embodiments, ClearAcc signal 408 clears the contents of accumulator 424. As an example, accumulation operations can be reset by clearing accumulator 424 and used to accumulate the result of multiplier 430. In some embodiments, ClearAcc signal 408 is used to clear accumulator 424 for performing a new dot-product operation. For example, elements-wise multiplications are performed by multiplier 430 and the partial-dot-product results are added using adder 432 and accumulator 424.

In various embodiments, accumulator 424 is an accumulator capable of accumulating the result of adder 432 and indirectly the result of multiplier 430. For example, in some embodiments, accumulator 424 is configured to accumulate the result of multiplier 430 with the contents of accumulator 424 based on the status of ClearAcc signal 408. As another example, based on the status of ClearAcc signal 408, the current result stored in accumulator 424 may be ignored by adder 432. In the example shown, accumulator 424 is a 32-bit wide accumulator. In various embodiments, accumulator 424 may be sized differently, e.g., 8-bits, 16-bits, 64-bits, etc., as appropriate. In various embodiments, each accumulator of the plurality of computation units of a computational array is the same size. In various embodiments, accumulator 424 may accumulate and save data, accumulate and clear data, or just clear data. In some embodiments, accumulator 424 may be implemented as an accumulation register. In some embodiments, accumulator 424 may include a set of arithmetic logic units (ALUs) that include registers.

In some embodiments, ResultEnable signal 412 is activated in response to a determination that data 404 is valid. For example, ResultEnable signal 412 may be enabled to enable processing by a computation unit such as processing by multiplier 430 and adder 432 into accumulator 424.

In some embodiments, ResultCapture signal 414 is utilized to determine the functionality of multiplexer 426. Multiplexer 426 receives as input ResultIn 406, output of accumulator 424, and ResultCapture signal 414. In various embodiments, ResultCapture signal 414 is used to enable either ResultIn 406 or the output of accumulator 424 to pass through as the output of multiplexer 426. In some embodiments, multiplexer 426 is implemented as an output register. In some embodiments, ResultIn 406 is connected to a computation unit in the same column as computation unit 400. For example, the output of a neighboring computation unit is fed in as an input value ResultIn 406 to computation unit 400. In some embodiments, the input of a neighboring computation unit is the computation unit's corresponding ResultOut value.

In some embodiments, shadow register 428 receives as input the output of multiplexer 426. In some embodiments, shadow register 428 is configured to receive the output of accumulator 424 via multiplexer 426 depending on the value of ResultCapture signal 414. In the example shown, the output of shadow register 428 is output value ResultOut 450. In various embodiments, once a result is inserted into shadow register 428, accumulator 424 may be used to commence new calculations. For example, once the final dot-product result is stored in shadow register 428, accumulator 424 may be cleared and used to accumulate and store the partial result and eventually the final result of a new dot-product operation on new weight and data input values. In the example shown, shadow register 428 receives a signal ShiftEn signal 416. In various embodiments, ShiftEn signal 416 is used to enable or disable the storing of values in the shadow register 428. In some embodiments, ShiftEn signal 416 is used to shift the value stored in shadow register 428 to output value ResultOut 450. For example, when ShiftEn signal 416 is enabled, the value stored in shadow register 428 is shifted out of shadow register 428 as output value ResultOut 450. In some embodiments, ResultOut 450 is connected to a neighboring computation unit's input value ResultIn. In some embodiments, the last cell of a column of computation units is connected to the output of the computational array. In various embodiments, the output of the computational array feeds into a vector engine such as vector engine 111 of FIG. 1 for vector processing. For example, the output ResultOut 450 of a computation cell such as computation cell 109 of FIG. 1 may be fed into a processing element of a vector engine such as processing element 113 of vector engine 111 of FIG. 1.

In the example shown, shadow register 428 is 32-bits wide. In various embodiments, shadow register 428 may be sized differently, e.g., 8-bits, 16-bits, 64-bits, etc., as appropriate. In various embodiments, each shadow register of the plurality of computation units of a computational array is the same size. In various embodiments, shadow register 428 is the same size as accumulator 424. In various embodiments, the size of multiplexer 426 is based on the size of accumulator 424 and/or shadow register 428 (e.g., the same size or larger).

In some embodiments, logic 434, 436, and 438 receive signals, such as control signals, to enable and/or configure the functionality of computation unit 400. In various embodiments, logic 434, 436, and 438 are implemented using AND gates and/or functionality corresponding to an AND gate. For example, as described above, logic 434 receives ClearAcc signal 408 and an input value corresponding to the value stored in accumulator 424. Based on ClearAcc signal 408, the output of logic 434 is determined and fed to adder 432. As another example, logic 436 receives ResultEnable signal 412 and Clock signal 410. Based on ResultEnable signal 412, the output of logic 436 is determined and fed to accumulator 424. As another example, logic 438 receives ShiftEn signal 416 and Clock signal 410. Based on ShiftEn signal 416, the output of logic 438 is determined and fed to shadow register 428.

In various embodiments, computation units may perform a multiplication, an addition operation, and a shift operation at the same time, i.e., within a single cycle, thereby doubling the total number of operations that occur each cycle. In some embodiments, results are moved from multiplexer 426 to shadow register 428 in a single clock cycle, i.e., without the need of intermediate execute and save operations. In various embodiments, the clock cycle is based on the signal received at Clock signal 410.

In various embodiments, input values weight 402 and data 404 are 8-bit values. In some embodiments, weight 402 is a signed value and data 404 is unsigned. In various embodiments, weight 402 and data 404 may be signed or unsigned, as appropriate. In some embodiments, ResultIn 406 and ResultOut 450 are 32-bit values. In various embodiments ResultIn 406 and ResultOut 450 are implemented using a larger number of bits than input operands weight 402 and data 404. By utilizing a large number of bits, the results of multiplying multiple pairs of weight 402 and data 404, for example, to calculate a dot-product result, may be accumulated without overflowing the scalar result.

In some embodiments, computation unit 400 generates an intermediate and/or final computation result in accumulator 424. The final computation result is then stored in shadow register 428 via multiplexer 426. In some embodiments, multiplexer 426 functions as an output register and store the output of accumulator 424. In various embodiments, the final computation result is the result of a convolution operation. For example, the final result at ResultOut 450 is the result of convolution between a filter received by computation unit 400 as input values using weight 402 and a two-dimensional region of sensor data received by computation unit 400 as input values using data 404.

As an example, a convolution operation may be performed using computation unit 400 on a 2×2 data input matrix [d0 d1; d2 d3] corresponding to a region of sensor data and a filter corresponding to a 2×2 matrix of weights [w0 w1; w2 w3]. The 2×2 data input matrix has a first row [d0 d1] and a second row [d2 d3]. The filter matrix has a first row [w0 w1] and a second row [w2 w3]. In various embodiments, computation unit 400 receives the data matrix via data 404 as a one-dimensional input vector [d0 d1 d2 d3] one element per clock cycle and weight matrix via weight 402 as a one-dimensional input vector [w0 w1 w2 w3] one element per clock cycle. Using computation unit 400, the dot product of the two input vectors is performed to produce a scalar result at ResultOut 450. For example, multiplier 430 is used to multiply each corresponding element of the input weight and data vectors and the results are stored and added to previous results in accumulator 424. For example, the result of element d0 multiplied by element w0 (e.g., d0*w0) is first stored in cleared accumulator 424. Next, element d1 is multiplied by element w1 and added using adder 432 to the previous result stored in accumulator 424 (e.g., d0*w0) to compute the equivalent of d0*w0+d1*w1. Processing continues to the third pair of elements d2 and w2 to compute the equivalent of d0*w0+d1*w1+d2*w2 at accumulator 424. The last pair of elements is multiplied and the final result of the dot product is now stored in accumulator 424 (e.g., d0*w0+d1*w1+d2*w2+d3*w3). The dot-product result is then copied to shadow register 428. Once stored in shadow register 428, a new dot-product operation may be initiated, for example, using a different region of sensor data. Based on ShiftEn signal 416, the dot-product result stored in shadow register 428 is shifted out of shadow register 428 to ResultOut 450. In various embodiments, the weight and data matrices may be different dimensions than the example above. For example, larger dimensions may be used.

In some embodiments, a bias parameter is introduced and added to the dot-product result using accumulator 424. In some embodiments, the bias parameter is received as input at either weight 402 or data 404 along with a multiplication identity element as the other input value. The bias parameter is multiplied against the identity element to preserve the bias parameter and the multiplication result (e.g., the bias parameter) is added to the dot-product result using adder 432. The addition result, a dot-product result offset by a bias value, is stored in accumulator 424 and later shifted out at ResultOut 450 using shadow register 428. In some embodiments, a bias is introduced using a vector engine such as vector engine 111 of FIG. 1.

Figure 5:
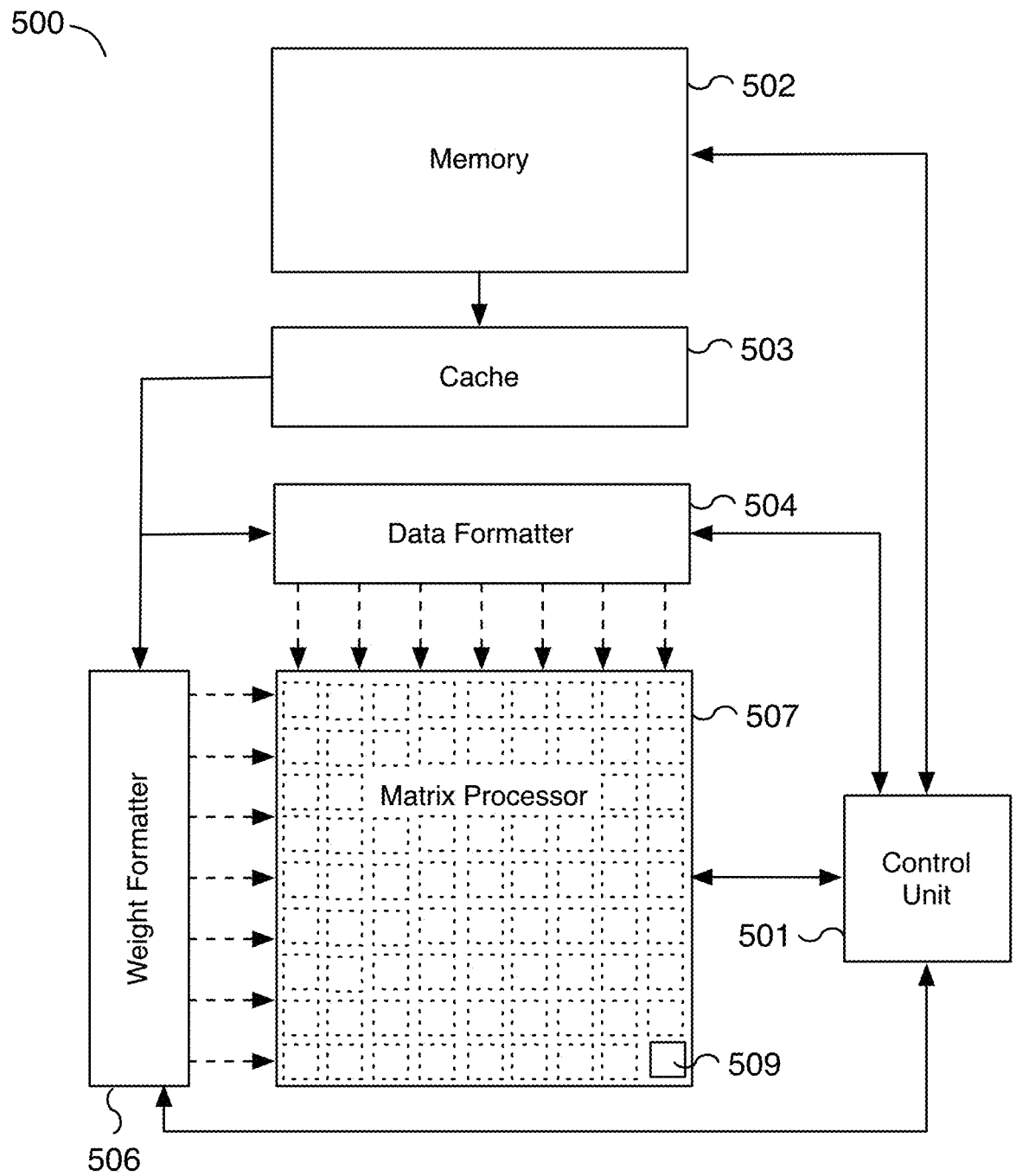
FIG. 5 is a block diagram illustrating an embodiment of a cache-enabled microprocessor system for performing machine learning processing.

FIG. 5 is a block diagram illustrating an embodiment of a cache-enabled microprocessor system for performing machine learning processing. The microprocessor system of FIG. 5 includes hardware data formatters that interface with a cache to prepare input values for a computational array such as a matrix processor. In various embodiments, incorporating a memory cache and using hardware data formatters to populate the cache increases the throughput of the matrix processor and allows the microprocessor system to operate at a higher clock rate than would otherwise be allowed. In the example shown, microprocessor system 500 includes control unit 501, memory 502, cache 503, data formatter 504, weight formatter 506, and matrix processor 507. Input data and weight data are retrieved by hardware data formatters 504, 506 from memory 502 via cache 503. The retrieved input values are formatted using data formatter 504 and weight formatter 506 to prepare vector operands for matrix processor 507. In some embodiments, data formatter 504 and weight formatter 506 include a logic circuit for preparing data for matrix processor 507 and/or a memory cache or buffer for storing and processing input data. For example, data formatter 504 may prepare N operands from a two-dimensional array retrieved from memory 502 via cache 503. Weight formatter 506 may prepare M operands retrieved from memory 502 via cache 503 that correspond to weight values. Data formatter 504 and weight formatter 506 prepare the N and M operands to be processed by matrix processor 507.

In various embodiments, microprocessor system 500 is microprocessor system 100 of FIG. 1 depicted with a memory and memory cache. With respect to microprocessor 100 of FIG. 1, in various embodiments, control unit 501 is control unit 101, data formatter 504 is data formatter 104, weight formatter 506 is weight formatter 106, and matrix processor 507 is matrix processor 107 of FIG. 1. Further, with respect to microprocessor 100 of FIG. 1, in various embodiments, data input 103 and weight input 105 of FIG. 1 are retrieved from memory 502 via cache 503. In some embodiments, microprocessor system 500, including at least hardware data formatter 504, weight formatter 506, and matrix processor 507, performs the processes described with respect to FIGS. 7 and 8 and portions of processes described with respect to FIGS. 2 and 3.

In some embodiments, matrix processor 507 is a computational array that includes a plurality of computation units. For example, a matrix processor receiving M operands and N operands from weight formatter 506 and data formatter 504, respectively, includes M×N computation units. In the figure shown, the small squares inside matrix processor 507 depict that matrix processor 507 includes a logical two-dimensional array of computation units. Computation unit 509 is one of a plurality of computation units of matrix processor 507. In some embodiments, each computation unit is configured to receive one operand from data formatter 504 and one operand from weight formatter 506. Matrix processor 507 and computation unit 509 are described in further detail with respect to matrix processor 107 and computation unit 109, respectively, of FIG. 1. Input values to matrix processor 507 are received from data formatter 504 and weight formatter 506 and described in further detail with respect to inputs from data formatter 104 and weight formatter 106 to matrix processor 107 of FIG. 1.

In the example shown, the dotted arrows between data formatter 504 and matrix processor 507 and between weight formatter 506 and matrix processor 507 depict a coupling between the respective pairs of components that are capable of sending multiple data elements such as a vector of data elements. In various embodiments, the data width of components data formatter 504, weight formatter 506, and matrix processor 507 are wide data widths and include the ability to transfer more than one operand in parallel. The data widths of components data formatter 504, weight formatter 506, and matrix processor 507 are described in further detail with respect to corresponding components data formatter 104, weight formatter 106, and matrix processor 107 of FIG. 1.

In various embodiments, the arrows in FIG. 5 describe the direction data and/or control signals flow from component to component. In some embodiments, the connections depicted by the one-direction arrows in FIG. 5 (e.g., between data formatter 504 and cache 503, between weight formatter 506 and cache 503, and between cache 503 and memory 502) may be bi-directional and thus the data and/or control signals may flow in both directions. For example, in some embodiments, control signals, such as a read request and/or data, can flow from cache 503 to memory 502.

In various embodiments, memory 502 is typically static random access memory (SRAM). In some embodiments, memory 502 has a single read port or a limited number of read ports. In some embodiments, the amount of memory 502 dedicated to storing data (e.g., sensor data, image data, etc.), weights (e.g., weight associated with image filters, etc.), and/or other data may be dynamically allocated. For example, memory 502 may be configured to partition more or less memory for data input compared to weight input based on a particular workload. In some embodiments, cache 503 includes one or more cache lines. For example, in some embodiments, cache 503 is a 1 KB cache that includes four cache lines where each cache line is 256 bytes. In various embodiments, the size of the cache may be larger or small, with fewer or more cache lines, have larger or smaller cache lines, and may be determined based on expected computation workload.

In various embodiments, hardware data formatters (e.g., data formatter 504 and weight formatter 506) calculate memory addresses to retrieve input values from memory 502 and cache 503 for processing by matrix processor 507. In some embodiments, data formatter 504 and/or weight formatter 506 stream data corresponding to a subset of values stored consecutively in memory 502 and/or cache 503. Data formatter 504 and/or weight formatter 506 may retrieve one or more subsets of values stored consecutively in memory and prepare the data as input values for matrix processor 507. In various embodiments, the one or more subsets of values are not themselves stored consecutively in memory with other subsets. In some embodiments, memory 502 contains a single read port. In some embodiments, memory 502 contains a limited number of read ports and the number of read ports is fewer than the data width of components data formatter 504, weight formatter 506, and matrix processor 507. In some embodiments, hardware data formatters 504, 506 will perform a cache check to determine whether a subset of values is in cache 503 prior to issuing a read request to memory 502. In the event the subset of values is cached, hardware data formatters 504, 506 will retrieve the data from cache 503. In various embodiments, in the event of a cache miss, hardware data formatters 504, 506 will retrieve the entire subset of values from memory 502 and populate a cache line of cache 503 with the retrieved values.

In some embodiments, control unit 501 initiates and synchronizes processing between components of microprocessor system 500, including components memory 502, data formatter 504, weight formatter 506, and matrix processor 507. In some embodiments, control unit 501 coordinates access to memory 502 including the issuance of read requests. In some embodiments, control unit 501 interfaces with memory 502 to initiate read requests. In various embodiments, the read requests are initiated by hardware data formatters 504, 506 via the control unit 501. In various embodiments, control unit 501 synchronizes data that is fed to matrix processor 507 from data formatter 504 and weight formatter 506. In some embodiments, control unit 501 synchronizes the data between different components of microprocessor system 500 including between data formatter 504, weight formatter 506, and matrix processor 507, by utilizing processor specific memory, queue, and/or dequeue operations and/or control signals. Additional functionality performed by control unit 501 is described in further detail with respect to control unit 101 of FIG. 1.

In some embodiments, microprocessor system 500 is utilized for performing convolution operations. For example, matrix processor 507 may be used to perform calculations, including dot-product operations, associated with one or more convolution layers of a convolution neural network. Data formatter 504 and weight formatter 506 may be utilized to prepare matrix and/or vector data in a format for processing by matrix processor 507. Memory 502 may be utilized to store data such as one or more image channels captured by sensors (not shown). Memory 502 may also include weights, including weights in the context of convolution filters, determined by training a machine learning model for autonomous driving.

In various embodiments, microprocessor system 500 may include additional components (not shown in FIG. 5), including processing components, such as a vector processor and a post-processing unit. An example of a vector processor and its associated functionality is vector engine 111 of FIG. 1. An example of a post-processing unit and its associated functionality is post-processing unit 115 of FIG. 1.

Figure 6:
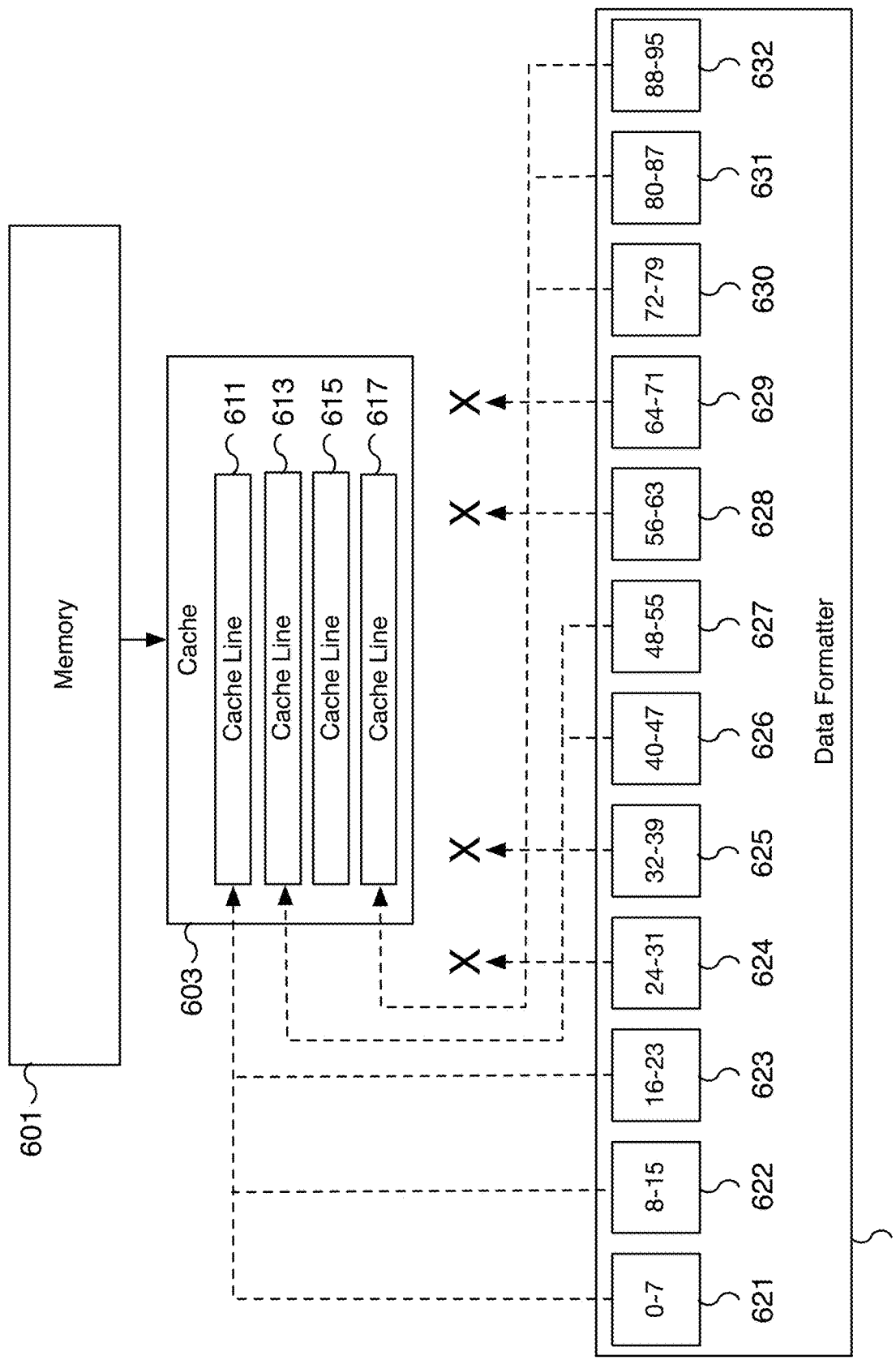
FIG. 6 is a block diagram illustrating an embodiment of a hardware data formatter, cache, and memory components of a microprocessor system.

FIG. 6 is a block diagram illustrating an embodiment of a hardware data formatter, cache, and memory components of a microprocessor system. In the example shown, the components include memory 601, cache 603, and hardware data formatter 605. Memory 601 is communicatively connected to cache 603 and cache 603 is communicatively connected to hardware data formatter 605. Cache 603 includes four cache lines 611, 613, 615, and 617. Hardware data formatter 605 includes twelve read buffers 621-632. Read buffers 621-632 are each 8-byte read buffers. In various embodiments, the number of and size of the read buffers may be fewer or more than depicted in the embodiment of FIG. 6. For example, read buffers 621-632 are sized to accommodate a 96 element input vector, where each element is 1-byte, to a computational array. In various embodiments, read buffers 621-632 may be implemented as a single wide register, a single memory storage location, individual registers, or individual memory storage locations, among other implementations, as appropriate. In some embodiments, memory 601 and cache 603 are memory 502 and cache 503 of FIG. 5, respectively. In some embodiments, hardware data formatter 605 is data formatter 104 and/or weight formatter 106 of FIG. 1. In some embodiments, hardware data formatter 605 is data formatter 504 and/or weight formatter 506 of FIG. 5.

In various embodiments, a control unit (not shown) such as control unit 101 of FIG. 1 and a computational array (not shown) such as matrix processor 107 of FIG. 1 are components of the microprocessor system. For example, a control unit sends signals to synchronize the processing of computational operations and/or access to memory 601. In various embodiments, a computational array receives input vectors from one or more hardware data formatters as input operands. For example, a matrix processor may receive two vector inputs, one from a data formatter and one from a weight formatter, to perform matrix processing on. As another example, a matrix processor may receive two matrices, one from a data formatter and one from a weight formatter, to perform matrix processing on. In various embodiments, multiple clock cycles are needed to feed an entire matrix into a computational array. For example, in some embodiments, at most one row (and/or column) of a matrix is fed into a computational array each clock cycle.

In various embodiments, the output of hardware data formatter 605 is fed as input to a computational array such as matrix processor 107 of FIG. 1 and matrix processor 507 of FIG. 5. In various embodiments, each element of each read buffer of hardware data formatter 605 is fed into a computation unit of a computational array. For example, the first byte of read buffer 621 is fed into a first computation unit of a computational array, the second byte of read buffer 621 is fed into a second computation unit of a computational array, the third byte of read buffer 621 is fed into a third computation unit of a computational array, and so forth, with the last byte of read buffer 621 (i.e., the eighth byte) feeding into the eighth computation unit of a computational array. The next read buffer then feeds its elements into the next set of computation units. For example, the first byte of read buffer 622 is fed into a ninth computation unit of a computational array and the last byte of read buffer 632 is fed into a ninety-sixth computation unit of a computational array. In various embodiments, the size and number of the read buffers and the number of computation units may vary. As explained above, in the example shown, hardware data formatter 605 includes 12 read buffers 621-632 configured to each store eight consecutive bytes. Hardware data formatter 605 may be configured to feed into a computation unit that may receive at least one input vector of 96 1-byte elements.

In some embodiments, only a portion of the elements in read buffers 621-632 is utilized as input to a computational array. For example, a two-dimensional 80×80 matrix may only utilize read buffers 621-630 (corresponding to 80 bytes, numbered bytes 0-79) to feed an 80-element row into a matrix processor. In various embodiments, hardware data formatter 605 may perform additional processing on one or more elements of read buffers 621-632 to prepare the elements as input to a computational array. For example, a computational array may be configured to receive 48 16-bit elements instead of 96 8-bit elements and hardware data formatter 605 may be configured to combine pairs of 1-byte elements to form 16-bit elements to prepare a 48 16-bit input vector for the computational array.

In various embodiments, cache 603 is a memory cache of memory 601. In some embodiments, memory 601 is implemented using static random access memory (SRAM). In some embodiments, cache 603 is a 1 KB memory cache and each cache line 611, 613, 615, and 617 is 256 bytes. In various embodiments, reading data into cache 603 loads an entire cache line of data into one of cache lines 611, 613, 615, and 617. In various embodiments, cache 603 may be larger or small and have fewer or more cache lines. Moreover, in various embodiments, the cache lines may be a different size. The size and configuration of cache 603, cache lines 611, 613, 615, and 617, and memory 601 may be sized as appropriate for the particular workload of computational operations. For example, the size and number of image filters used for convolution may dictate a larger or smaller cache line and a larger or smaller cache.

In the example shown, the dotted-lined arrows originating from read buffers 621-632 indicate whether the data requested by hardware data formatter 605 exists as a valid entry in cache 603 and in particular which cache line holds the data. For example, read buffers 621, 622, and 623 request data that is found in cache line 611. Read buffers 626 and 627 request data that is found in cache line 613 and read buffers 630, 631, and 632 request data that is found in cache line 617. In various embodiments, each read buffer stores a subset of values located consecutively in the memory. The subsets of values stored at read buffers 621, 622, and 623 may not be located consecutively in memory with the subsets of values stored at read buffers 626 and 627 and also may not be located consecutively in memory with the subsets of values stored at read buffers 630, 631, and 632. In some scenarios, read buffers referencing the same cache line may store subsets of values that are not located consecutively in memory. For example, two read buffers may reference the same cache line of 256 bytes but different 8-byte subsets of consecutive values.

In the example shown, the data requested for read buffers 624, 625, 628, and 629 are not found in cache 603 and are cache misses. In the example shown, an "X" depicts a cache miss. In various embodiments, cache misses must be resolved by issuing a read for the corresponding subset of data from memory 601. In some embodiments, an entire cache line containing the requested subset of data is read from memory 601 and placed into a cache line of cache 603. Various techniques for cache replacement may be utilized as appropriate. Examples of cache replacement policies for determining the cache line to use include First In First Out, Least Recently Used, etc.

In some embodiments, each of read buffers 621-632 stores a subset of values located consecutively in memory. For example, in the example shown, read buffer 621 is 8-bytes in size and stores a subset of 8-bytes of values stored consecutively in memory. In various embodiments, the values are located consecutively in memory 601 and read as a continuous block of values into a cache line of cache 603. By implementing read buffers using the concept of a subset of values, where each of the values is located consecutively in memory, each read buffer is capable of loading multiple elements (e.g., up to eight elements for an 8-byte read buffer) together. In the example shown, a fewer number of reads are required than the number of elements to populate every read buffer with an element. For example, up to twelve reads are required to load 96-elements into the twelve read buffers 621-632. In many scenarios, even fewer reads are necessary in the event that a cache contains the requested subset of data. Similarly, in some scenarios, a single cache line is capable of storing the data requested for multiple read buffers.

In some embodiments, read buffers 621-632 are utilized by hardware data formatter 605 to prepare input operands such as an vector of inputs for a computational array, such as matrix processor 107 of FIG. 1. In some embodiments, the 96-bytes stored in read buffers 621-632 correspond to a 96-element input vector for a computational array. In some embodiments, hardware data formatter 605 selects elements from read buffers 621-632 to accommodate a particular stride when performing a computational operation such as convolution. In some embodiments, hardware data formatter 605 selectively filters out the elements from read buffers 621-632 that are not required for the computational operation. For example, hardware data formatter may only utilize a portion of the elements from each read buffer (e.g., every other byte of a read buffer) as the input vector elements for the computational array. In some embodiments, the filtering is performed using a multiplexer to selectively include elements from read buffers 621-632 when preparing an input vector for a computational operation. In various embodiments, the unused bytes of the read buffer may be discarded.

As an example, in a scenario with a stride parameter set to two, the initial input elements for a convolution operation are every other element of a row of an input matrix. Depending on the input matrix size, the elements include the 1st, 3rd, 5th, and 7th elements, etc., for the first group of input elements necessary for a convolution operation. Read buffer 621 is configured to read the first 8 elements (1 through 8), and thus elements 2, 4, 6, and 8 are not needed for a stride of two. As another example, using a stride of five, four elements are skipped when determining the start of the next neighboring region. Depending on the size of the input data, the 1st, 6th, 11th, 16th, and 21st elements, etc., are the first input elements necessary for a convolution operation. The elements 2-5 and 7-8 are loaded into a read buffer 621 but are not used for calculating the first dot-product component result corresponding to each region and may be filtered out.

In various embodiments, each read buffer loads eight consecutive elements and can satisfy two elements for a stride of five. For example, read buffer 621 initiates a read at element 1 and also reads in element 6, read buffer 621 initiates a read at element 11 and also reads in element 16, read buffer 622 initiates a read at element 21 and also reads in element 26, etc. In some embodiments, the reads are aligned to multiples of the read buffer size. In some embodiments, only the first read buffer is aligned to a multiple of the read buffer size. In various embodiments, only the start of each matrix row must be aligned to a multiple of the read buffer size. Depending on the stride and the size of the input matrix, in various embodiments, only a subset of the read buffers may be utilized. In various embodiments, the elements corresponding to least twelve regions, one element for each read buffer 621-632, are loaded and fed to a computational array in parallel. In various embodiments, the number of input elements provided in parallel to a computational array is at least the number of read buffers in the hardware data formatter.

In some embodiments, the elements not needed for the particular stride are filtered out and not passed to the computational array. In various embodiments, using, for example, a multiplexer, the input elements conforming to the stride are selected from the loaded read buffers and formatted into an input vector for a computational array. Once the input vector is formatted, hardware data formatter 605 feeds the input vector to the computational array. The unneeded elements may be discarded. In some embodiments, the unneeded elements may be utilized for the next dot-product component and a future clock cycle and are not discarded from read buffers 621-632. In various embodiments, the elements not needed for implementing a particular stride are fed as inputs to a computational array and the computational array and/or post-processing will filter the results to remove them. For example, the elements not needed may be provided as input to a computation array but the computation units corresponding to the unnecessary elements may be disabled.

In some embodiments, hardware data formatter 605 formats the input vector for a computational array to include padding. For example, hardware data formatter 605 may insert padding using read buffers 621-632. In various embodiments, one or more padding parameters may be described by a control unit using a control signal and/or instruction parameter.

In some embodiments, hardware data formatter 605 determines a set of addresses for preparing operands for a computational array. For example, hardware data formatter 605 calculates associated memory locations required to load a subset of values, determines whether the subset is cached, and potentially issues a read to memory for the subset in the event of a cache miss. In some scenarios, a pending read may satisfy a cache miss. In various embodiments, hardware data formatter 605 only processes the memory address associated with the start element and end element of each read buffer 621-632. In various embodiments, each read buffer 621-632 associates the validity of the cache entry for a subset of values with the memory addresses of the start and end values of the corresponding read buffer. In the example shown, read buffer 621 is configured to store 8-bytes corresponding to up to eight elements. In various embodiments, hardware data formatter 605 calculates the address of the first element and the address of the last element of read buffer 621. Hardware data formatter 605 performs a cache check on the first and last element addresses. In the event either of the addresses is a cache miss, hardware data formatter 605 issues a memory read for 8-bytes starting at the address of the first element. In the event that both addresses are a cache hit from the same cache line, hardware data formatter 605 considers every element in the subset to be a valid cache hit and loads the subset of values from the cache via the appropriate cache line. In this manner, an entire row of elements may be loaded by processing the addresses of at most the first and last addresses of each read buffer 621-632 (e.g., at most 24 addresses).

Figure 7:
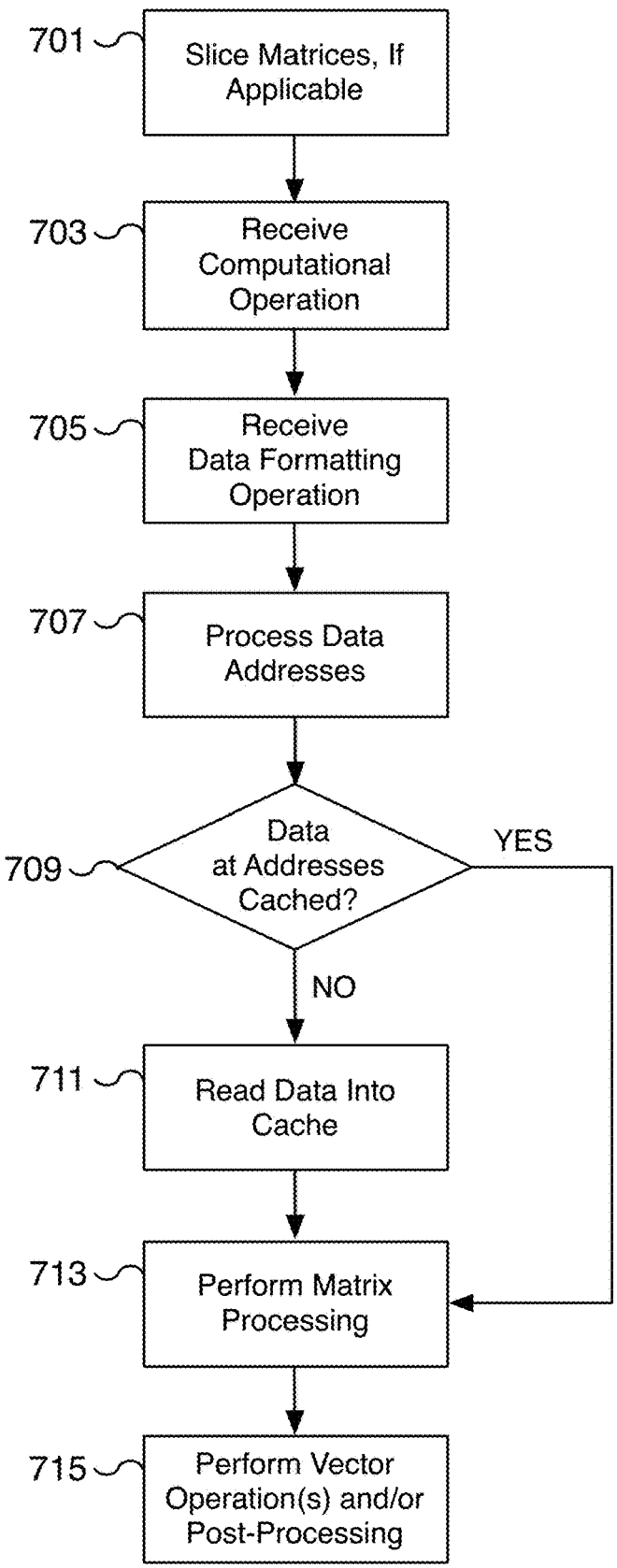
FIG. 7 is a flow diagram illustrating an embodiment of a process for performing machine learning processing.

FIG. 7 is a flow diagram illustrating an embodiment of a process for performing machine learning processing. The process of FIG. 7 describes a pipeline for slicing one or more matrices to fit a computational array, receiving a computational operation for the sliced matrix or matrices, preparing the data for performing the operation, and computing one or more results associated with the operation. Depending on the application, the process of FIG. 7 may be repeated on different slices of a matrix and the results combined. For example, a frame of image data larger than a computational array may be sliced into smaller matrices and computational operations performed on the sliced matrices. The results of multiple passes of FIG. 7 on different slices may be combined to generate the result of a computational operation on the entire frame. In various embodiments, the process of FIG. 7 is performed by a microprocessor system such as the microprocessor system of FIGS. 1 and 5. In various embodiments, the process of FIG. 7 is utilized to implement applications relying on computational operations such as convolution. For example, the process of FIG. 7 may be utilized to implement a machine learning application that performs inference using a machine learning model. In some embodiments, the process of FIG. 7 is utilized to implement the processes of FIGS. 2 and 3.

At 701, one or more matrices may be sliced. In some embodiments, the size of a matrix, for example, a matrix representing a frame of vision data, is larger than will fit in a computational array. In the event the matrix exceeds the size of the computational array, the matrix is sliced into a smaller two-dimensional matrix with a size limited to the appropriate dimensions of the computational array. In some embodiments, the sliced matrix is a smaller matrix with addresses to elements referencing the original matrix. In various embodiments, the sliced matrix is serialized into a vector for processing. In some embodiments, each pass of the process of FIG. 7 may slice a matrix into a different slice and slices may overlap with previous slices. In various embodiments, a data matrix and a weight matrix may both be sliced, although typically only a data matrix will require slicing. In various embodiments, matrices may be sliced only at boundaries corresponding to multiples of the read buffer size of a hardware data formatter. For example, in the event each read buffer is 8-bytes in size, each row of a sliced matrix must begin with an address having a multiple of eight. In the event a matrix fits within the computational array, no slicing is required (i.e., the matrix slice used for the remaining steps of FIG. 7 is simply the original matrix). In various embodiments, the matrix slice(s) are used as input matrices for the computational operation of 703.

At 703, a computational operation is received. For example, a matrix operation is received by the microprocessor system. As one example, a computational operation requesting a convolution of an image with a filter is received. In some embodiments, the operation may include the necessary parameters to perform the computational operation including the operations involved and the operands. For example, the operation may include the size of the input operands (e.g., the size of each input matrix), the start address of each input matrix, a stride parameter, a padding parameter, and/or matrix, vector, and/or post-processing commands. For example, a computational operation may describe an image data size (e.g., 96×96, 1920×1080, etc.) and bit depth (e.g., 8-bits, 16-bits, etc.) and a filter size and bit depth, etc. In some embodiments, the computational operation is received by a control unit such as control unit 101 of FIG. 1 and 501 of FIG. 5. In some embodiments, a control unit processes the computational operation and performs the necessary synchronization between components of the microprocessor system. In various embodiments, the computational operation is a hardware implementation using control signals. In some embodiments, the computational operation is implemented using one or more processor instructions.

At 705, each hardware data formatter receives a data formatting operation. In some embodiments, the data formatting operation is utilized to prepare input arguments for a computational array such as matrix processor 107 of FIG. 1 and 507 of FIG. 5. For example, each hardware data formatter receives a data formatting operation that includes information necessary to retrieve the data associated with a computational operation (e.g., a start address of a matrix, a matrix size parameter, a stride parameter, a padding parameter, etc.) and to prepare the data to be fed as input into the computational array. In some embodiments, the data formatting operation is implemented using control signals. In some embodiments, the data formatting operation is received by a hardware data formatter such as data formatter 104 and 504 of FIGS. 1 and 5, respectively, and weight formatter 106 and 506 of FIGS. 1 and 5, respectively. In some embodiments, hardware data formatter is hardware data formatter 605 of FIG. 6. In some embodiments, a control unit such as control unit 101 of FIG. 1 and 501 of FIG. 5 interfaces with a hardware data formatter to process data formatting operations.

At 707, data addresses are processed by one or more hardware data formatters. For example, addresses corresponding to elements of the computational operation are processed by one or more hardware data formatters based on the formatting operations received at 705. In some embodiments, the addresses are processed in order for the hardware data formatter to load the elements (from a cache or memory) and prepare an input vector for a computational array. In various embodiments, a hardware data formatter first calculates a pair of memory addresses for each subset of values to determine whether a subset of elements exists in a cache before issuing a request to memory in the event of a cache miss. In various embodiments, a read request to memory incurs a large latency that may be minimized by reading elements from a cache. In some scenarios, all elements are read from a cache and thus require any cache misses to first populate the cache by issuing a read to memory. To minimize the latency for each read, in various embodiments, the reads are performed on subsets of elements (or values). In some embodiments, memory may only have a limited number of read ports, for example, a single read port, and all reads are processed one at a time. For example, performing 96 independent reads incurs the latency of 96 independent reads for a memory with a single read port. To reduce read latency, subsets of values are read together from memory into corresponding read buffers of a hardware data formatter. For example, using subsets of eight values, at most 12 memory reads are required to read 96 values. In the event some of the subsets are in the cache from previous memory reads, even fewer memory reads are required.

In various embodiments, subsets of values are prepared by determining the memory addresses for the start value of each subset (where each value corresponds to an element) and the end value of each subset. For example, to prepare a subset of 8-values each of 1-byte, a cache check is performed using the calculated address of the start value and the calculated address of the end value of the subset. In the event either of the addresses are cache misses, a memory read is issued to read 8-bytes from memory beginning at the address of the start value. In some embodiments, in addition to reading the requested 8-bytes from memory, an entire cache line of data (corresponding to multiple subsets) is read from memory and stored in the cache. In various embodiments, in the event the start and end addresses of a subset are cached at the same cache line, the entire subset of values is considered cached and no cache check is needed for the remaining elements of the subset. The entire subset is considered cached in the event the start and end elements are cached in the same cache line. In various embodiments, the processing at 707 determines the addresses of the start value of the subset and the end value of the subset for each subset of values. In various embodiments, one read buffer exists for each subset of values. In various embodiments, read buffers of a hardware data formatter are read buffers 621-632 of hardware data formatter 605 of FIG. 6.

In some embodiments, a stride parameter is implemented and non-consecutive subsets of values are loaded into each read buffer. In various embodiments, each subset of continuous values includes one or more elements needed to implement a particular stride parameter. For example, for a stride of one, every value in a subset of values located consecutively in memory is a utilized element. As another example, for a stride of two, every other value located consecutively in memory is utilized and a subset of eight consecutive values includes four utilized elements and four that are not utilized. As another example, for a stride of five, a subset of eight values located consecutively in memory may include two utilized elements and six unused elements. For each subset of elements located consecutively in memory, the memory addresses for the start and end elements of the subset are determined and utilized to perform a cache check at 709. In various embodiments, the start element of the subset is the first element of the subset. In some embodiments, the end element of the subset is the last element of the subset, regardless of whether the element is utilized to implement the stride parameter. In some embodiments, the end element of the subset is the last utilized element and not the last element of the subset.

In various embodiments, once the number of utilized elements that are included in a subset of consecutive elements is determined, the next subset of elements begins with the next element needed to satisfy the stride parameter. The next element may result in a memory location that is located at an address non-consecutive with the address of the last element of the previous subset. As an example, using a stride of five, four elements are skipped when determining the start of the next subset of values. Depending on the size of the input data, the 1st and 6th elements are stored in the first subset of values, 11th and 16th elements in the second subset of values, and 21st and 26th elements in the third subset of values, etc. In various embodiments, the second subset of values starts with the 11th element and the third subset of values starts with the 21st element. Each subset is located in memory at locations non-consecutive with the other subsets. Examples of unused elements in the first subset of values include the elements 2-5 and 7-8. In some embodiments, the first row of each matrix is aligned to a multiple of the subset size. In some embodiments, this alignment restriction is required to prevent gaps of invalid values between rows when a matrix is serialized. In some embodiments, all subsets are aligned to the multiple of the subset size.

In various embodiments, each subset of values is loaded in a read buffer such as read buffers 621-632 of FIG. 6. Depending on the particular application (e.g., the stride, the size of the input matrix, the size of the read buffer, the number of read buffers, etc.), some of the read buffers of a hardware data formatter may not be utilized. In some scenarios, the number of input elements provided in parallel to a computational array is at least the number of subsets. For example, a hardware data formatter supporting twelve subsets of values can provide at least twelve elements in parallel to a computational array.

In some embodiments, the formatting performed by a hardware data formatter includes converting a matrix into a vector with elements of the vector fed to a computational array over multiple clock cycles. For example, in some embodiments, a matrix corresponding to data (e.g., image data) is formatted to prepare vectors corresponding to sub-regions of the data. In some embodiments, each element fed to a computational array for a particular clock cycle corresponds to the n-th element of a vector associated with a sub-region of the data. As an example, a 3×3 matrix may be formatted into a one-dimensional vector of nine elements. Each of the nine elements may be fed into the same computation unit of a computational array. In various embodiments, feeding the 9 elements requires are least 9 clock cycles.

At 709, a determination is made whether the data corresponding to the addresses determined for each subset at 707 are cached. For example, a cache check is performed on each subset by determining whether the data associated with the address of the start value of the subset and the address of the end value of the subset is in the same cache line. In various embodiments, a cache check is performed for each read buffer, such as read buffers 621-632 of FIG. 6, of a hardware data formatter. In the event the data is cached, the processing continues to 713. In various embodiments, the cache utilized is cache 503 of FIGS. 5 and/or 603 of FIG. 6. In the event the data is not cached, processing continues to 711.

At 711, each requested subset of data is read into the cache as an entire subset of values. In various embodiments, each subset data is read into the cache from memory. In some embodiments, the memory is memory 502 of FIG. 5 and 601 of FIG. 6. In some embodiments, an entire cache line is read into the cache. For example, a cache miss for a subset of values results in loading the subset of values into a cache line along with the other data located consecutively with the subset of values in memory. In some scenarios, a single cache line is sufficient to cache multiple subsets.

At 713, matrix processing is performed. For example, a matrix processor performs a matrix operation using the data cached and received by a hardware data formatter. In various embodiments, the cached data is received by the hardware data formatter and processed according to a formatting operation by a hardware data formatter into input values for matrix processing. In some embodiments, the processing by the hardware data formatter includes filtering out a portion of the received cached data. For example, in some embodiments, subsets of values located consecutively in memory are read into the cache and received by the hardware data formatter. In various embodiments, a computational operation may specify a stride and/or padding parameters. For example, to implement a specified stride for convolution, one or more data elements may be filtered from each subset of values. In some embodiments, only a subset of the elements from each of the subsets of values is selected to create an input vector for matrix processing.

In various embodiments, the matrix processor performs the computational operation specified at 703. For example, a matrix processor such as matrix processor 107 of FIG. 1 and 507 of FIG. 5 performs a matrix operation on input vectors received by hardware data formatters. In various embodiments, the matrix processor commences processing once all the input operands are made available. The output of matrix processing is fed to 715 for optional additional processing. In various embodiments, the result of matrix processing is shifted out of a computational array one vector at a time.

At 715, vector and/or post-processing operations are performed. For example, vector processing may include the application of an activation function such as a rectified linear unit (ReLU) function. In some embodiments, vector processing includes scaling and/or normalization. In various embodiments, vector processing is performed on one vector of the output of a computational array at a time. In some embodiments, vector processing is performed by a vector processor such as vector engine 111 of FIG. 1. In various embodiments, post-processing operations may be performed at 715. For example, post-processing operations such as pooling may be performed using a post-processor unit. In some embodiments, post-processing is performed by a post-processing processor such as post-processing unit 115 of FIG. 1. In some embodiments, vector and/or post-processing operations are optional operations.

Figure 8:
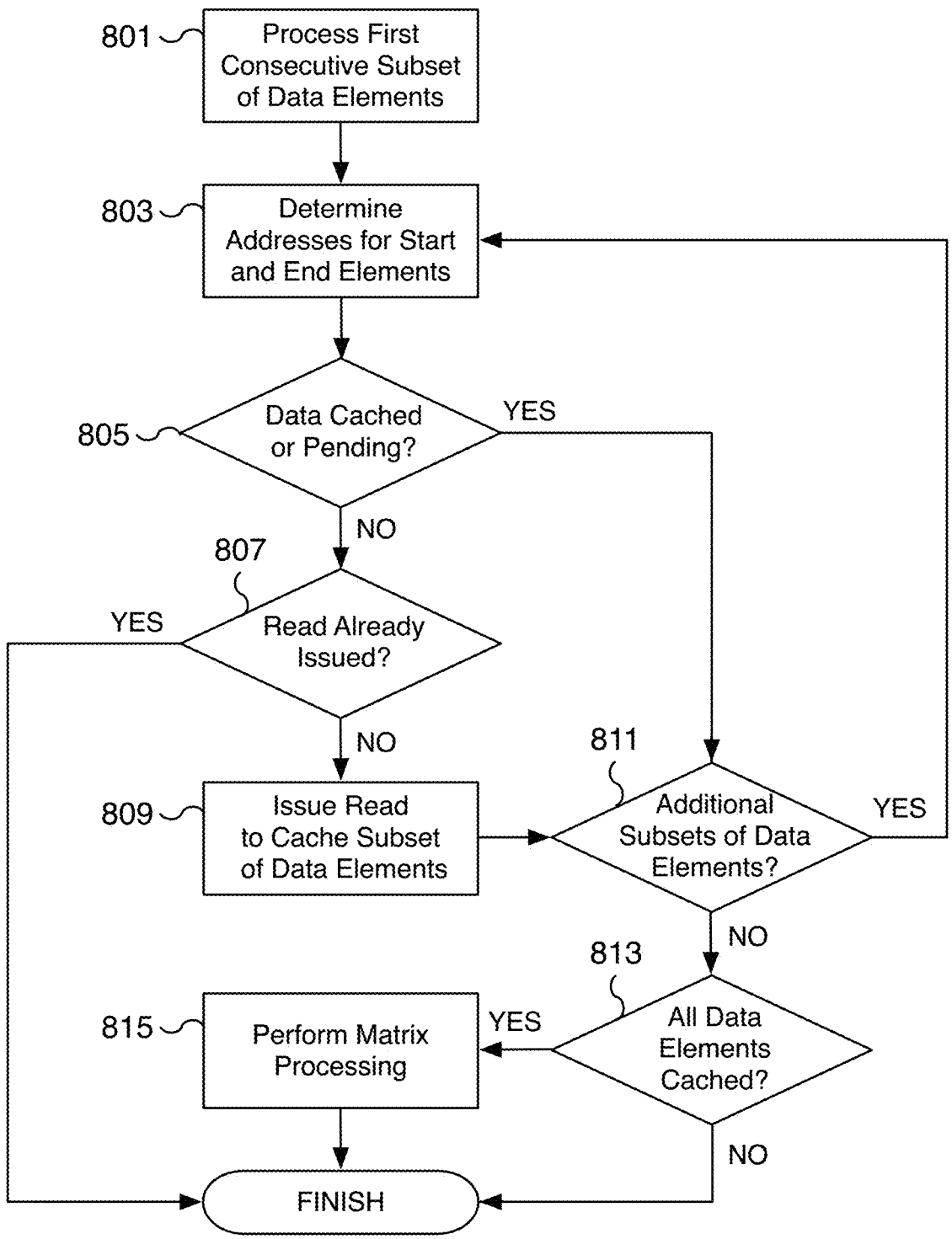
FIG. 8 is a flow diagram illustrating an embodiment of a process for retrieving input operands for a computational array.

FIG. 8 is a flow diagram illustrating an embodiment of a process for retrieving input operands for a computational array. The process of FIG. 8 describes a process for preparing data elements by a hardware data formatter for a computational array. For example, the input data is partitioned into subsets based on the number of read buffers of a hardware data formatter. The process of FIG. 8 is utilized to load the corresponding read buffers with data corresponding to subsets of values located consecutively in memory. By partitioning values into subsets based on memory location and performing a single read on the entire subset instead of an individual read for each element, the latency incurred from accessing memory is reduced. In various embodiments, the process of FIG. 8 is performed by a microprocessor system such as the microprocessor system of FIGS. 1 and 5. In various embodiments, the process of FIG. 8 is implemented at 707, 709, 711, and 713 of FIG. 7. In various embodiments, the memory utilized by the process of FIG. 8 is memory 502 of FIG. 5 and 601 of FIG. 6. In various embodiments, the cache utilized by the process of FIG. 8 is cache 503 of FIG. 5 and 603 of FIG. 6. In various embodiments, the process of FIG. 8 is performed at least in part by a hardware data formatter such as the hardware data formatters of FIGS. 1, 5, and 6. For example, a hardware data formatter may be utilized to perform the steps of 801, 803, 805, 807, 809, 811, 813, and portions of 815. In some embodiments, the process of FIG. 8 is utilized to implement the processes of FIGS. 2 and 3.

In some embodiments, the process of FIG. 8 is performed in parallel on different read buffers and/or subset of values. For example, in a scenario with eight read buffers, the data to be loaded into the read buffers may be partitioned into at most eight subsets and the process of FIG. 8 is performed on each subset in parallel. In some embodiments, the number of subsets is based on capabilities of the cache and/or the memory. For example, the number of subsets may be based on how many simultaneous cache checks may be performed on the cache and/or the number of simultaneous reads to memory that may be issued.

At 801, the first subset of data elements located consecutively in memory is processed. In various embodiments, the first consecutive subset of data corresponds to the data element designated for the first read buffer of a hardware data formatter. In some embodiments, the address of the first element must be a multiple of the number of elements in each subset. For example, using an 8-byte read buffer, the address of the first element must be a multiple of eight.

At 803, start and end memory addresses are determined for the current subset. For example, the memory address of the start element of a subset and the memory address of the end element of a subset are determined. In various embodiments, the start and end addresses are determined by a hardware data formatter, such as the hardware data formatters of FIGS. 1, 5, and 6.

At 805, a determination is made on whether the subset of data is cached or pending a read. For example, a determination is made whether the data corresponding to the start and end addresses determined at 803 are cached at the same cache line or will be cached as a result of an already issued memory read. In some embodiments, a pending read for a different subset brings an entire cache line of data into memory and will result in caching the current subset. In the event the data is not cached or will not be cached as a result of a pending memory read, processing continues to 807. In the event the data is cached or will be cached by a pending memory read, processing continues to 811.

At 807, a determination is made on whether a memory read is already issued. In the event a memory read is already issued, processing completes for the current clock cycle. In the event a memory read has not been issued, processing continues to 809. In some embodiments, the memory is configured with a single read port (e.g., to increase density) and the memory can only process one read at a time. In various embodiments, the determination of whether a memory read has been issued is based on the capability of the memory configuration and/or the availability of memory read ports. Not shown in FIG. 8, in some embodiments, in the event an additional memory read is supported for the current clock cycle (despite a pending read), processing continues to 809; otherwise processing completes for the current clock cycle.

At 809, a read is issued to cache a subset of data elements. For example, a block of memory beginning at the start address determined at 803 and extending for the length based on the size of a read buffer is read from memory into the memory cache. In various embodiments, an entire cache line of memory is read into the memory cache. For example, in a scenario with a cache line of 256 bytes and read buffers each capable of storing 8-bytes, a memory read will read 256 bytes of continuous data into a cache line, which corresponds to 32 subsets of non-overlapping 8-byte values. In various embodiments, reading a subset of values as a single memory read request reduces the latency associated with loading each element. Moreover, reading multiple subsets of values together may further reduce the latency by caching other subsets of values that may be associated with other read buffers. In some embodiments, loading multiple subsets of values takes advantage of potential locality between the subsets resulting in lower latency.

At 811, a determination is made on whether there are additional subsets of data elements. In the event that every subset has been processed, processing continues to 813. In the event that there are additional subsets to be processed, processing loops back to 803. In some embodiments, depending on the input size, one or more read buffers of a hardware data formatter may not be utilized.

At 813, a determination is made on whether all the data elements are cached. In the event some elements are not cached, processing completes for the current clock cycle to allow the non-cached data elements to be loaded from memory into the cache. In the event all the data elements are cached, the data elements are all available for processing and processing proceeds to 815.

At 815, matrix processing is performed. For example, the cached data elements are received at one or more hardware data formatters, formatted, and fed as input vector(s) to a computational array for processing. A computational array, such as matrix processor 107 of FIG. 1 and 507 of FIG. 5, performs matrix processing on the input vectors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A microprocessor system, comprising:
   a computational array that includes a plurality of computation units, wherein each of the plurality of computation units operates on a corresponding value of a group of values addressed from memory and a first portion of the group of values operated by the plurality of computation units are synchronously provided together to the computational array to be processed in parallel in a first computation processing; and
   a hardware data formatter configured to, based on a stride, provide the first portion of the group of values to the computational array for the first computation processing and identify a second portion of the group of values not provided for the first computation processing, wherein the hardware data formatter is configured to perform a cache check to obtain the first portion of the group of values,
   and wherein the second portion of the group of values are stored and provided, by the hardware data formatter, to the computational array for a second computation processing subsequent to the first computation processing.

2. The system of claim 1, wherein the first portion of the group of values located consecutively in the memory and the second portion of the group of values located consecutively in the memory, and the first portion is not located consecutively in the memory from the second portion.

3. The system of claim 2, wherein the first portion is retrieved from a cache using a single cache read.

4. The system of claim 2, wherein the first portion of the group of values and the second portion of the group of values are retrieved from a single cache line.

5. The system of claim 2, wherein the cache check is performed for the first portion of the group of values based on determining whether a first value and a last value for the first portion of the group of values are stored in a cache.

6. The system of claim 2, wherein the hardware data formatter is configured to determine a corresponding start memory address for each of the first portion of the group of values and the second portion of the group of values.

7. The system of claim 6, wherein the hardware data formatter is configured to determine a corresponding end memory address for each of the first portion of the group of values and the second portion of the group of values.

8. The system of claim 6, wherein the cache check is performed for each of the first portion of the group of values and the second portion of the group of values based on determining whether a value stored at the determined starting memory addresses for the first portion of the group of values and the second portion of the group of values has been cached.

9. The system of claim 1, wherein the computational array is configured to receive at least two vector input operands.

10. The system of claim 1, wherein each computation unit of the plurality of computation units is configured to perform a dot-product component operation using the group of values in parallel.

11. The system of claim 1, wherein each computation unit of the plurality of computation units includes an arithmetic logic unit, an accumulator, and a shadow register.

12. The system of claim 1, wherein the group of values corresponds to an input channel of vision data.

13. The system of claim 1, wherein the group of values corresponds to sensor data.

14. The system of claim 13, wherein the sensor data is non-image sensor data.

15. The system of claim 14, wherein the non-image sensor data includes ultrasonic, radar, or LiDAR data.

16. The system of claim 1, wherein the group of values corresponds to a convolution filter.

17. The system of claim 16, wherein the convolution filter is constructed to identify features of an input data.

18. The system of claim 1, wherein the memory is configured to dynamically adjust an allocation between a first portion of the memory for a data input and a second portion of the memory for a weight input.

19. The system of claim 1, wherein subsets of values included in the group of values are selected based at least in part on a padding parameter or a stride parameter.

20. A method comprising:
receiving a computational operation;
receiving a data formatting operation at a hardware data formatter;
retrieving, based on a stride and via the hardware data formatter, a first group of values associated with an input data, wherein the hardware data formatter performs a cache check to retrieve the first group of values, wherein the first group of values includes a first subset of values, and wherein a second subset of values is identified via the hardware data formatter;
retrieving a second group of values associated with a weight data;
providing in parallel the first subset of values and the second group of values to a computational array microprocessor, wherein the second subset is not provided; and
processing the first group of values and the second group of values as operands in parallel using the computational array microprocessor and the computational operation, wherein the second subset is subsequently processed by the computational array microprocessor using a second computational operation.

\* \* \* \* \*